United States Patent
Prokhorenkova et al.

(10) Patent No.: US 12,536,451 B2
(45) Date of Patent: Jan. 27, 2026

(54) METHODS AND SYSTEMS FOR GENERATING AN UNCERTAINTY SCORE FOR AN OUTPUT OF A GRADIENT BOOSTED DECISION TREE MODEL

(71) Applicant: YANDEX EUROPE AG, Lucerne (CH)

(72) Inventors: Lyudmila Aleksandrovna Prokhorenkova, Moscow (RU); Aleksey Ivanovich Ustimenko, Ivanovo (RU); Andrey Alekseevich Malinin, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 1043 days.

(21) Appl. No.: 17/351,719

(22) Filed: Jun. 18, 2021

(65) Prior Publication Data

US 2022/0405615 A1 Dec. 22, 2022

(51) Int. Cl.
 *G06N 5/04* (2023.01)
 *G06N 5/01* (2023.01)
 *G06N 20/20* (2019.01)

(52) U.S. Cl.
 CPC .............. *G06N 5/04* (2013.01); *G06N 5/01* (2023.01); *G06N 20/20* (2019.01)

(58) Field of Classification Search
 CPC ............. G06N 5/01; G06N 20/20; G06N 5/04
 See application file for complete search history.

(56) References Cited

U.S. PATENT DOCUMENTS 6,725,208 B1 4/2004 Hartman et al.
7,313,550 B2 12/2007 Kulkarni et al.
(Continued)

FOREIGN PATENT DOCUMENTS

RU 2632143 C1 10/2017
WO 03081527 A1 10/2003

OTHER PUBLICATIONS

Valdenegro-Toro, "Deep Sub-Ensembles for Fast Uncertainty Estimation in Image Classification," 2019, arXiv:1910.08168v2 (Year: 2019).*

(Continued)

*Primary Examiner* — Michael J Huntley
*Assistant Examiner* — Vincent Anton Spraul
(74) *Attorney, Agent, or Firm* — BCF LLP

(57) ABSTRACT

A method of generating an uncertainty score for an output of a Gradient Boosted Decision Tree (GBDT) model is disclosed. The output is a prediction of the GBDT model for an in-use dataset. The method comprises acquiring the GBDT model including a sequence of trees beginning with an initial tree and ending with a last tree, a given one of the sequence of trees having been stochastically built during a current training iteration of the GBDT model, and defining a plurality of sub-sequences of trees in the sequence of trees as sub-models of the GBDT model. During a given in-use iteration of the GBDT model executable for the in-use dataset, the method comprises generating a plurality of sub-outputs using the respective sub-models and generating the uncertainty score using the plurality of sub-outputs, the uncertainty score being indicative of how different sub-outputs from the plurality of sub-outputs are amongst each other.

23 Claims, 6 Drawing Sheets

(56) References Cited

U.S. PATENT DOCUMENTS

| | | | |
|---|---|---|---|
| 7,472,096 | B2 | 12/2008 | Burges et al. |
| 7,558,764 | B2 | 7/2009 | Abe et al. |
| 8,275,721 | B2 | 9/2012 | Abe et al. |
| 10,510,002 | B1 | 12/2019 | Olabiyi et al. |
| 10,510,003 | B1 | 12/2019 | Olabiyi et al. |
| 10,963,814 | B2 | 3/2021 | Gupta et al. |
| 2006/0195440 | A1 | 8/2006 | Burges et al. |
| 2007/0094171 | A1 | 4/2007 | Burges et al. |
| 2009/0006360 | A1 | 1/2009 | Liao et al. |
| 2017/0097936 | A1 | 4/2017 | Glover |
| 2017/0293859 | A1 | 10/2017 | Gusev et al. |
| 2017/0364810 | A1 | 12/2017 | Gusev et al. |
| 2018/0121730 | A1 | 5/2018 | Li |
| 2018/0225291 | A1 | 8/2018 | Balinsky et al. |
| 2018/0340787 | A1* | 11/2018 | Sheth ............... G06F 7/023 |
| 2019/0171912 | A1* | 6/2019 | Vallespi-Gonzalez ............... G06N 7/01 |
| 2019/0212977 | A1 | 7/2019 | Sicurelli, III et al. |
| 2019/0258878 | A1* | 8/2019 | Koivisto ............ G06V 10/774 |
| 2019/0303795 | A1 | 10/2019 | Khiari et al. |
| 2020/0401149 | A1* | 12/2020 | Gong ............... G06Q 10/00 |
| 2021/0034865 | A1* | 2/2021 | Nord ............... G06F 18/254 |
| 2021/0201112 | A1* | 7/2021 | Gauthier Melançon ............... G06V 10/40 |
| 2021/0374553 | A1 | 12/2021 | Li et al. |

OTHER PUBLICATIONS

Wickstrom et al., "Uncertainty-Aware Deep Ensembles for Reliable and Explainable Predictions of Clinical Time Series," Oct. 2020, arXiv:2010.11310v1 (Year: 2020).*

Zeldes, "Using Uncertainty to Interpret your Model," 2018, https://www.datasciencecentral.com/using-uncertainty-to-interpret-your-model/ (Year: 2018).*

"Feature Importance and Feature Selection With XGBoost in Python," 2020, https://machinelearningmastery.com/feature-importance-and-feature-selection-with-xgboost-in-python (Year: 2020).*

Office Action issued on Jun. 17, 2024 in respect of the related U.S. Appl. No. 17/207,403.

Ustimenko et al., "SGLB: Stochastic Gradient Langevin Boosting", Yandex.Research, Moscow, Russia, Computer Science > Machine Learning, Mar. 2020, https://arxiv.org/abs/2001.07248v2, 10 pages.

Friedman, "Stochastic Gradient Boosting", Mar. 1999, pp. 1-10.

"CatBoost is a high-performance open source library for gradient boosting on decision trees", https://catboost.ai accessed on Jan. 26, 2021, pdf 5 pages.

Chen et al., "Accelerating Nonconvex Learning via Replica Exchange Langevin Diffusion", Published as a conference paper at ICLR May 2019, pp. 1-23.

Ge et al., "Escaping From Saddle Points—Online Stochastic Gradient for Tensor Decomposition", Computer Science >Machine Learning, Mar. 2015, https://arxiv.org/abs/1503.02101v1, pp. 1-46.

Xu et al., "Global Convergence of Langevin Dynamics Based Algorithms for Nonconvex Optimization", Statistics > Machine Learning, Feb. 2018, https://arxiv.org/abs/1707.06618, pp. 1-36.

Welling et al., "Bayesian Learning via Stochastic Gradient Langevin Dynamics", Proceedings of the 28 th International Conference on Machine Learning, USA, Jun.-Jul. 2011, pp. 1-8.

Ahn, "Bayesian Posterior Sampling via Stochastic Gradient Fisher Scoring", Proceedings of the 29 th International Conference on Machine Learning, UK, Jul. 2012, pp. 1-8.

Kamalaruban et al., "Reinforcement Learning with Langevin Dynamics", Optimization Foundations for Reinforcement Learning Workshop at NeurIPS, Vancouver, Dec. 2019, 8 pages.

Zhang et al., "A Hitting Time Analysis of Stochastic Gradient Langevin Dynamics", arXiv:1702.05575v3, Apr. 2018, pp. 1-44.

Patterson et al., "Stochastic Gradient Riemannian Langevin Dynamics on the Probability Simplex", Advances in Neural Information Processing Systems, Dec. 2013, pp. 1-9.

Mou et al., "Generalization Bounds of SGLD for Non-convex Learning: Two Theoretical Viewpoints", Computer Science > Machine Learning, 2017, aarXiv.org > cs > arXiv:1707.05947, Jul. 20, 2017, pp. 1-29.

Zou et al., "Subsampled Stochastic Variance-Reduced Gradient Langevin Dynamics", Mathematics, Computer Science, 2018, 11 pages. Published in UAI Aug. 6-10, 2018.

Wang, "Quadratic Majorization for Nonconvex Loss with Applications to the Boosting Algorithm", Journal of Computational and Graphical Statistics, Jan. 2018, pp. 1-41.

Wang et al., "Gradient Boosting", MachineLearning, May 1, 2020, pp. 1-30.

Liu et al., "Stochastic Non-convex Optimization with Strong High Probability Second-order Convergence", Nov. 2017; Mathematics > Optimization and Control, arXiv:1710.09447v2, 2017, pp. 1-8.

Raginsky et al., "Non-Convex Learning via Stochastic Gradient Langevin Dynamics: A Nonasymptotic Analysis", arXiv:1702.03849v3 [cs.LG], 2017, 30 pages. Published Jun. 4, 2017.

Sukhbaatar et al., "Training Convolutional Networks with Noisy Labels", ICLR 2015, arXiv, Apr. 2015, pp. 1-11.

Agarwal et al., "Counterfactual Learning-to-Rank for Additive Metrics and Deep Models", https://www.cs.cornell.edu/people/tj/publications/agarwal_etal_18b.pdf, 10 pages. Published 2018.

Sukhbaatar et al., "Learning from Noisy Labels with Deep Neural Networks", Computer Science, Artificial Intelligence, Evolutionary Computing, arXiv, Jun. 2014, pp. 1-10.

Viegas da Silva et al., "PCA and Gaussian noise in MLP neural network training improve generalization in problems with small and unbalanced data sets", The 2011 International Joint Conference on Neural Networks, USA, Jul. 31-Aug. 5, 2011, pp. 2664-2669.

Bruch et al., "A Stochastic Treatment of Learning to Rank Scoring Functions", Published on Jan. 22, 2020, pp. 61-69, https://doi.org/10.1145/3336191.3371844.

Gulin et al., "Winning The Transfer Learning Track of Yahoo!'s Learning to Rank Challenge with YetiRank", JMLR: Workshop and Conference Proceedings:14 (2011), pp. 63-76, Yahoo! Learning to Rank Challenge.

Office Action issued on Aug. 28, 2024 in respect of the related U.S. Appl. No. 17/223,680.

Notice of Allowance dated Oct. 15, 2024 received in respect of a related U.S. Appl. No. 17/207,403.

Russian Search Report dated Jul. 14, 2022 issued in respect of the counterpart Russian Patent Application No. RU 2020113384.

* cited by examiner

METHODS AND SYSTEMS FOR GENERATING AN UNCERTAINTY SCORE FOR AN OUTPUT OF A GRADIENT BOOSTED DECISION TREE MODEL

FIELD

The present technology relates to systems and methods for generating machine-learning models. In particular, the present technology is directed to a method of and a system for generating an uncertainty score for an output of a Gradient Boosted Decision Tree (GBDT) model.

BACKGROUND

Machine learning algorithms (MLAs) are used to address multiple needs in computer-implemented technologies. Typically, the MLAs are used for generating a prediction based on data provided thereto.

MLAs are used in search engines for generating ranked lists of search results, by a recommendation platform for identifying digital content for recommendation, and even by weather forecasting systems for modelling future weather patterns. There are many different types of MLAs known in the art. Broadly speaking, there are three types of MLAs: supervised learning based MLAs, unsupervised learning based MLAs and reinforcement learning based MLAs.

One example of supervised learning MLAs are decision tree models. This type of MLA uses a decision tree to go from observations about an item (represented in the branches) to conclusions about the item's target value (represented in the leaves). Tree models where the target variable can take a discrete set of values are called classification trees; in these tree structures, leaves represent class labels and branches represent conjunctions of features that lead to those class labels. Decision trees where the target variable can take continuous values (typically real numbers) are called regression trees.

In order for the Decision Tree (DT) model to work, it needs to be "built" or trained using a training set of objects containing a large plurality of training objects (such as documents, events, or the like). Some DT models can be trained using a Gradient Boosting (GB) technique where new trees are built and added to the model.

SUMMARY

Embodiments of the present technology have been developed based on developers' appreciation of at least one technical problem associated with the prior art approaches to building Gradient Boosted Decision Tree (GBDT) models and for determining uncertainty of outputs of the GBDT models.

GBDT Models

Gradient boosting (GB) is a machine-learning method that can be used on tasks containing heterogeneous features, complex dependencies, and noisy data, such as in applications related to web search, recommendation systems, weather forecasting, and many others. Broadly speaking, GB iteratively combines weak models to obtain more accurate ones. A Decision Tree (DT) model trained based on GB techniques may be referred to as a GBDT model.

GBDT models are used in libraries such as XGBoost, LightGBM, and CatBoost. It should be noted that the CatBoost library and additional information regarding gradient boosting algorithms is available at https://catboost.ai.

It is contemplated that at least some embodiments of the present technology can be implemented in accordance with the CatBoost framework.

Broadly speaking, the GB method allows to iteratively combine weak models, such as DTs, to obtain more accurate predictions. It can be formulated that, given a dataset D and a loss function L: $\mathbb{R}^2 \to \mathbb{R}$, the GB algorithm iteratively constructs a GBDT model F: $X \to \mathbb{R}$ to minimize the empirical risk $L(F|D)=\mathbb{E}_D[L(F(x),y)]$. At each iteration t the model is updated as:

$$F^{(t)}(x)=F^{(t-1)}(x)+\varepsilon h^{(t)}(x) \quad (1)$$

where $F^{(t-1)}$ is a model constructed at the previous iteration, $h^{(t)}(x) \in H$ is a weak learner chosen from some family of functions H, and $\varepsilon$ is learning rate. The weak learner $h^{(t)}$ can be chosen to approximate the negative gradient $$-g^{(t)}(x, y) := -\frac{\partial L(y, s)}{\partial s}\bigg|_{s=F^{(t-1)}(x)} ;$$

$$h^{(t)} = \underset{h \in H}{\arg\min} \mathbb{E}_D\left[(-g^{(t)}(x, y) - h(x))^2\right] \quad (2)$$

A weak learner $h^{(t)}$ is associated with parameters $\varphi^{(t)} \in \mathbb{R}^d$ and the formulation $h^{(t)}(x, \varphi^{(t)})$ is made to reflect this association. The set of weak learners H can consists of shallow DTs, which are models that recursively partition the feature space into disjoint regions called leaves. Each leaf $R_j$ of the tree is assigned to a value, which is the estimated response y in the corresponding region. It can be formulated that $h^{(t)}(x, \varphi^{(t)}) = \sum_{j=1}^d \varphi_j^{(t)} 1_{\{x \in R_j\}}$, so the DT is a linear function of $\varphi^{(t)}$. Therefore, it can be said that the "final" GBDT model F can be, in some embodiments, a combination of DTs and the parameters of the full model are denoted by $\theta$.

It should also be noted that GBDT models can be "stochastically" trained using techniques such as "Stochastic Gradient Boosting" (SGB), where during each training iteration, a subset of training objects is randomly chosen for building a tree during that training iteration, and "Stochastic Gradient Langevin Boosting" (SGLB) that combines gradient boosting with stochastic gradient Langevin Dynamics to achieve convergence to the global optimum even for non-convex loss functions. Both of these techniques are stochastic GB techniques, where new trees are stochastically generated in the GBDT model via different forms of noise injection.

Uncertainty of Prediction

For many applications of GBDT models, and especially high-risk applications such as healthcare, finance, autonomous driving and the like, one of the key aspects of GBDT models is the quantification of uncertainty in the predictions to avoid costly mistakes. For example, in self-driving cars, it is necessary to know when the AI-pilot is confident in its ability to drive and when it is not to avoid a fatal collision. In financial forecasting and medical diagnostics, mistakes on the part of an AI forecasting or diagnostic system could either lead to large financial or reputational loss or to the loss of life. Amongst other application-specific data, financial and medical data are often represented in heterogeneous tabular form—data on which GBDT models can be applied.

Developers of the present technology have realized the distinction between two types of uncertainties, namely data uncertainty and knowledge uncertainty. Data uncertainty arises from class overlap or from noisy input data (also called aleatoric uncertainty). Knowledge uncertainty arises when the model inherently lacks knowledge about in-use input data, such that the current in-use input data is far/different from the training data (also called epistemic uncertainty). The most common reason for knowledge uncertainty is a lack of training data. Indeed, as mentioned above, this second type of uncertainty arises when the in-use data is very different from the training data (out-of-domain inputs).

To better illustrate knowledge uncertainty, let it be assumed that a GBDT model has been trained to make predictions, such as age prediction only for human faces, for example. If the GBDT model is presented during in-use with a cat face, the age prediction of the GBDT model will uncertain due to a lack of training knowledge about cat faces. In this example, the in-use data (cat faces) can be said to be "out-of-domain inputs" since the training data domain relates to human faces.

In at least some embodiments of the present technology, there is provided a method of employing an ensemble-based algorithm for knowledge uncertainty of a GBDT model. Broadly speaking, "ensemble" methods use multiple learning algorithms to obtain better predictive performance than could be obtained from any of the constituent learning algorithms alone. A machine learning ensemble consists of a finite set of alternative models. It should be noted that distribution of the alternative algorithms' outputs may be used to determine a knowledge uncertainty for a given input. In other words, it can be said that a level of "disagreement" between a number of alternative algorithms may be used to estimate the knowledge uncertainty.

In at least some embodiments of the present technology, there is provided a method of determining a "score" indicative of knowledge uncertainty associated with an output of a given GBDT model. In some embodiments, this score may be obtained by training a plurality of alternative GBDT models, to form an ensemble. The outputs of the alternative GBDT models may be used in combination for computing the score.

It is contemplated that knowledge uncertainty can be estimated by considering an ensemble of models $\{p(y|x; \theta^{(m)})\}_{m=1}^{M}$ sampled from the posterior $p(\theta|D)$. It can be said that the level of "diversity" or "disagreement" between the models is an estimate of knowledge uncertainty.

SGB Ensembles

In at least some embodiments of the present technology, there are devised methods of using SGB ensembles for determining the score indicative of knowledge uncertainty associated with an output of a given GBDT model.

In these embodiments, an ensemble may be formed by generating several independent models via SGB algorithm. As mentioned above, stochasticity is added to GBDT models via random subsampling of the data at every iteration. In this embodiment, at each iteration, a subset of training objects D' can be selected (via bootstrap or uniformly without replacement, for example), which is smaller than the original training dataset D, and use D' to build the next tree instead of D. The fraction of chosen objects can be referred to as sample rate. This implicitly injects, noise into the learning process effectively inducing a distribution $q(\theta)$ over such models. Thus, an SGB ensemble in accordance with these embodiments is an ensemble of independent models $\{\theta^{(m)}\}_{m=1}^{M}$ built by a SGB algorithm with different random seeds for sub-sampling data.

SGLB Ensembles

In other embodiments of the present technology, there are devised methods of using SGLB ensembles for determining the score indicative of knowledge uncertainty associated with an output of a given GBDT model.

Developers of the present technology have devised a method to sample GBDT models from the true posterior $p(\theta|D)$ via SGLB algorithm. As alluded to above, SGLB combines GB with stochastic gradient Langevin dynamics in order to achieve convergence to the global optimum even for non-convex loss functions. Broadly speaking, the SGLB algorithm has two differences compared with the SGB algorithm.

First, Gaussian noise can be explicitly injected into the gradients, so that:

$$h^{(t)} = \underset{h \in H}{\mathrm{argmin}} \mathbb{E}_D\left[(-g^{(t)}(x, y) - h(x, \varphi) + \nu)^2\right], \nu \sim \mathcal{N}\left(0, \frac{2}{\beta \varepsilon} I_{|D|}\right) \quad (3)$$

where $\beta$ is the inverse diffusion temperature and $I_{|D|}$ is an identity matrix. This random noise $\nu$ helps to explore the solution space in order to find the global optimum and the diffusion temperature controls the level of exploration. Second, it can be formulated that:

$$F^{(t)}(x) = (1-\gamma\varepsilon)F^{(t-1)}(x) + \varepsilon h^{(t)}(x, \varphi^{(t)}) \quad (4)$$

where $\gamma$ is regularization parameter. If the number of all possible trees is finite (a natural assumption given that the training dataset is finite), then the SGLB parameters $\theta(t)$ at each iteration form a Markov chain that weakly converges to the stationary distribution, also called the invariant measure:

$$p_\beta^*(\theta) \propto \exp(-\beta L(\theta|D) - \beta\gamma\|\Gamma\theta\|_2^2) \quad (5)$$

where $\Gamma = \Gamma^{-T} > 0$ is an implicitly defined regularization matrix which depends on a given tree construction algorithm that is described in a co-owned U.S. patent application Ser. No. 17/207,403, entitled "Methods and Systems for Training a Decision-Tree Based Machine Learning Algorithm (MLA)", filed on Mar. 19, 2021, the contents of which is incorporated herein by reference in its entirety.

It is contemplated that the SGLB algorithm may be used to enable sampling from the true posterior. To that end, in these embodiments, the following can be set:

$$\beta = |D| \text{ and } \gamma = \frac{1}{2|D|}.$$

For the negative log-likelihood loss function, the invariant measure can be expressed as:

$$p_\beta^*(\theta) \propto \exp(\log p(D|\theta) - \frac{1}{2}\|\Gamma\theta\|_2^2) \propto p(D|\theta)p(\theta) \quad (6)$$

which is proportional to the true posterior distribution $p(\theta|D)$ under Gaussian prior $p(\theta) = \mathcal{N}(0,\Gamma)$. Thus, in these embodiments, an SGLB ensemble is an ensemble of independent models $\{\theta^{(m)}\}_{m=1}^{M}$ generated according to the SGLB algorithm using different random seeds. In these embodiments, models can be sampled from the true posterior $p(\theta|D)$ asymptotically.

Developers of the present technology have also realized that while SGB and SGLB algorithms can yield ensembles of independent models, their time and space complexity is M times larger than that of a single model, which is a costly overhead. It can be said that training and using such ensembles of independent models is a time-consuming and resource-consuming tasks. In some implementations, generating such ensembles may require increasing complexity and/or sacrificing the quality by reducing the number of training iterations.

Virtual Ensembles

To address this, in some embodiments, developers of the present technology have devised methods and servers for training, and using, a single GBDT model consisting of a sequence of trees, and where sub-sequences of trees in that sequence are defined as respective "sub-models" that can be used for quantifying knowledge uncertainty of outputs of the given GBDT model.

Developers of the present technology have realized that a GBDT model is itself an "ensemble" of trees. In contrast to random forests formed by independent trees, the sequential nature of GBDT models results in that all trees are dependent and individual trees are not considered as separate models. Hence, in some embodiments of the present technology, "truncated" sequences of a single GBDT model are used as respective elements of an ensemble. Such a virtual ensemble can be obtained using a single GBDT model.

In some embodiments of the present technology, a server may be configured to execute a procedure applied to SGLB models as described below. In these embodiments, asymptotic sampling from the true posterior $p(\theta|D)$ may be guaranteed.

In these embodiments, each "truncated" model may be represented by a vector of parameters $\theta(t)$. As the parameters $\theta(t)$ at each iteration of the SGLB algorithm form a Markov chain that weakly convergences to the stationary distribution, they may be used as an ensemble of models. Unlike parameters taken from different SGLB trajectories, the parameters from these truncated models may have a higher degree of correlation. In some embodiments, this effect can be overcome by retaining only every Kth set of parameters.

In these embodiments, it can be formulated that $K \geq 1$ and a set of models can be formulated as $$\Theta_{T,K} = \left\{ \theta^{(Kt)}, \left\lceil \frac{T}{2K} \right\rceil \leq t \leq \left\lceil \frac{T}{K} \right\rceil \right\}, -i.e.,$$

every Kth model may be add to $\Theta_{T,K}$ obtained while constructing a single SGLB model using T iterations of GB. In some embodiments, selecting larger values of K may allow reducing the correlation between samples from the SGLB Markov chain.

In some cases, the models $\theta(t)$ with $t<T/2$ may be excluded from the ensemble as equation (6) holds asymptotically. In these embodiments, a virtual ensemble refers to the set of $$M = \left\lceil \frac{T}{2K} \right\rceil$$

number of models $\Theta T,K$.

It should be noted that the prediction (output) of $\Theta T,K$ can be computed with the same computation time as one $\theta^{(T)}$. In some embodiments, the predictions made by individual trees can be summed for obtain the prediction of the GBDT model, and partial sums may be stored to obtain the virtual ensemble.

Applications

In at least some embodiments of the present technology, the score indicative of "knowledge uncertainty" for an output of a GBDT model, and can also be combined with an other uncertainty score indicative of "data uncertainty" for the output of the GBDT model, thereby forming a combined score indicative of the total uncertainty of the output. As such, the uncertainty score may be used to highlight relevant out-of-domain examples (i.e. with a relatively high knowledge uncertainty) that may be added to the training of the model to increase a robustness and/or an accuracy thereof. It may be used, for example, by active learning techniques.

For example, total and/or knowledge uncertainty of predictions can be leverages for medical applications. Medical data is often heterogenous, and GBDT models are well-suited for making predictions on such data. Indeed, computing the score may facilitate identification of uncertain predictions, which can be detrimental for diagnosis purposes. For example, an uncertain prediction may be flagged to a human operator.

In yet another example, total and/or knowledge uncertainty of predictions can be leverages for financial applications. Akin to medical data, financial data is also often heterogenous, and GBDT models are well-suited for making predictions on such data. For example, a GBDT model may be used as a component of algorithms used by "robo-advisors" for automatically buying and selling stocks and use pattern detection to monitor and predict the overall future health of global financial markets. Also, GBDT models may be employed to execute trades at optimal times. Further, a GBDT model may be used to determine a Risk-to-Reward (RR) ratio of a given financial product based on respective financial data.

In further examples, total and/or knowledge uncertainty of predictions can be leverages when providing computer-implemented services such as, but not limited to: search engines, recommendation platforms, collaborative labelling platforms, and the like.

As another example, uncertainty scores associated with GBDT model predictions may be leverage in weather forecasting applications. It should be noted that predictions made for weather forecasting applications are based on heterogenous data. In this example, the GBDT model may be employed in a Deep learning-based weather prediction (DLWP) method and configured to receive meteorological data comprising information about physical parameters, that may have been measured directly by instrumentation, such as temperature, dew point, wind direction, wind speed, cloud cover, cloud layer(s), ceiling height, visibility, current weather, and precipitation amount. The GBDT model may be employed for generating inputs for an other prediction model configured to forecast weather. In some cases, the uncertainty score may be used as an additional input feature.

In a first broad aspect of the present technology, there is provided a method of generating an uncertainty score for an output of a Gradient Boosted Decision Tree (GBDT) model, the output being a prediction of the GBDT model for an in-use dataset, the method executable by a server, the method comprising acquiring, by the server, the GBDT model including a sequence of trees beginning with an initial tree and ending with a last tree. A given one of the sequence of trees has been stochastically built during a current training iteration of the GBDT model based on a current sequence of prior trees available at the current training iteration. The method further comprises defining, by the server, a plurality of sub-sequences of trees in the sequence of trees as sub-models of the GBDT model. A given one of the plurality of sub-sequences of trees begins with the initial tree and ending with a respective offset tree in the sequence of trees between the initial tree and the last tree, the respective offset tree being offset from the initial tree by an offset parameter, the offset parameter being different for each of the plurality of sub-sequences of trees. During a given in-use iteration of the GBDT model executable for the in-use dataset, the method further comprises generating, by the server, a plurality of sub-outputs using the respective sub-models. A given one of the plurality of sub-outputs is generated by a respective one of the plurality of sub-sequences of trees. The method further comprises generating, by the server, the uncertainty score using the plurality of sub-outputs, the uncertainty score being indicative of how different sub-outputs from the plurality of sub-outputs are amongst each other.

In some embodiments of the present technology, the method further comprises, during the given in-use iteration, generating, by the server, the output for the in-use dataset using the sequence of trees, the output being generated using all trees from the sequence of trees.

In some embodiments of the present technology, a first one from the plurality of sub-sequences of trees is nested in a second one from the plurality of sub-sequences of trees.

In some embodiments of the present technology, a first one from the plurality of sub-sequences of trees includes a total number of trees that is different from a total number of trees included in a second one from the plurality of sub-sequences of trees.

In some embodiments of the present technology, a first one from the plurality of sub-sequences of trees and a second one from the plurality of sub-sequences of trees comprise a sub-set of same trees and a sub-set of differing trees.

In some embodiments of the present technology, a first one from the plurality of sub-sequences of trees includes a second one from the plurality of sub-sequences of trees and at least one next tree from the sequence of trees.

In some embodiments of the present technology, the given one from the plurality of sub-sequences of trees excludes the last tree in the sequence of trees.

In some embodiments of the present technology, the method further comprises in response to the uncertainty score being below a pre-determined threshold, confirming, by the server, the output of the GBDT model.

In some embodiments of the present technology, the method further comprises in response to the uncertainty score being above a pre-determined threshold, determining, by the server, the in-use dataset is an out-of-domain dataset for the GBDT model.

In some embodiments of the present technology, the method further comprises providing, by the server, the output for the GBDT model and the uncertainty score to an other prediction model, the other prediction model having been trained to use the output of the GBDT model and the uncertainty score as inputs for generation an other output.

In some embodiments of the present technology, the other prediction model is at least one of a ranking model, Object Detection Neural Network (ODNN), and a Deep learning-based weather prediction (DLWP) model.

In some embodiments of the present technology, the GBDT model has been trained to classify the in-use dataset and the output is indicative of a predicted class of the in-use dataset.

In some embodiments of the present technology, the GBDT model has been trained to perform regression on the in-use dataset and the output being a continuous value predicted for the in-use dataset.

In some embodiments of the present technology, generating, by the server, the uncertainty score using the plurality of sub-outputs comprises determining a variance of the plurality of sub-outputs.

In a second aspect of the present technology, there is provided a method of generating an uncertainty score for an output of a Gradient Boosted Decision Tree (GBDT) model, the output being a prediction of the GBDT model for an in-use dataset, the method executable by a server. The method comprises acquiring, by the server, the GBDT model including a sequence of trees. A given one from the sequence of trees has been stochastically built during a current training iteration of the GBDT model based on a current sequence of trees available at the current training iteration. During a given in-use iteration of the GBDT model executable for the in-use dataset, the method further comprises generating, by the server using the sequence of trees, a plurality of tree-outputs for the in-use dataset, a given one from the plurality of tree-outputs generated by a respective one from the sequence of trees and, for a first sub-sequence of trees in the sequence of trees, generating, by the server, a first sub-output by combining tree-outputs from the first sub-sequence of trees. The first sub-sequence of trees includes M number of sequential trees from the sequence of trees. The method further comprises, for a second sub-sequence of trees in the sequence of trees, generating, by the server, a second sub-output by combining tree-outputs from the second sub-sequence of trees, the second sub-sequence of trees including N number of sequential trees from the sequence of trees, the N number being different from the M number. The method further comprises generating, by the server, the uncertainty score using the first and the second sub-outputs, the uncertainty score being indicative of how different the first sub-output is from the second sub-output.

In some embodiments of the present technology, the method further comprises generating, by the server, the output for the GBDT model by combining all tree-outputs in the plurality of tree-outputs.

In some embodiments of the present technology, the first sub-sequence of trees and the second sub-sequence of trees form a virtual ensemble in the sequence of trees.

In some embodiments of the present technology, the method further comprises in response to the uncertainty score being below a pre-determined threshold, confirming, by the server, the output of the GBDT model.

In some embodiments of the present technology, the method further comprises in response to the uncertainty score being above a pre-determined threshold, determining, by the server, the in-use dataset is an out-of-domain dataset for the GBDT model.

In a third aspect of the present technology, there is provided a method of generating an uncertainty score for an output of a Gradient Boosted Decision Tree (GBDT) model, the output being a prediction of the GBDT model for an in-use dataset, the method executable by a server. The method comprises acquiring, by the server, the GBDT model including a sequence of trees beginning with an initial tree and ending with a last tree. A given one of the sequence of trees has been stochastically built during a current training iteration of the GBDT model based on a current sequence of prior trees available at the current training iteration. The method further comprises acquiring, by the server, a plurality of other GBDT models including respective other sequences of trees. The plurality of other GBDT models have been trained on a plurality of training datasets from a same domain than training datasets used to train the GBDT model, each one from the plurality of other GBDT models being different from the GBDT model. The method further comprises, during a given in-use iteration of the GBDT model executable for the in-use dataset, generating, by the server, a plurality of outputs using the respective ones from the plurality of other GBDT models, a given one of the plurality of outputs being generated by a respective other sequence of trees and generating, by the server, the uncertainty score using the plurality of outputs, the uncertainty score being indicative of how different outputs from the plurality of outputs are amongst each other.

In a third aspect of the present technology, there is provided a server for generating an uncertainty score for an output of a Gradient Boosted Decision Tree (GBDT) model, the output being a prediction of the GBDT model for an in-use dataset the server comprising a processor and a memory configured to store instructions which, upon being executed by the processor, cause the server to acquire the GBDT model including a sequence of trees beginning with an initial tree and ending with a last tree, a given one of the sequence of trees having been stochastically built during a current training iteration of the GBDT model based on a current sequence of prior trees available at the current training iteration, define a plurality of sub-sequences of trees in the sequence of trees as sub-models of the GBDT model, a given one of the plurality of sub-sequences of trees beginning with the initial tree and ending with a respective offset tree in the sequence of trees between the initial tree and the last tree, the respective offset tree being offset from the initial tree by an offset parameter, the offset parameter being different for each of the plurality of sub-sequences of trees. The server is further configured to, during a given in-use iteration of the GBDT model executable for the in-use dataset, generate a plurality of sub-outputs using the respective sub-models, a given one of the plurality of sub-outputs being generated by a respective one of the plurality of sub-sequences of trees and generate the uncertainty score using the plurality of sub-outputs, the uncertainty score being indicative of how different sub-outputs from the plurality of sub-outputs are amongst each other.

In some embodiments of the present technology, the server is further configured to, during the given in-use iteration, generate the output for the in-use dataset using the sequence of trees, the output being generated using all trees from the sequence of trees.

In some embodiments of the present technology, a first one from the plurality of sub-sequences of trees is nested in a second one from the plurality of sub-sequences of trees.

In some embodiments of the present technology, a first one from the plurality of sub-sequences of trees includes a total number of trees that is different from a total number of trees included in a second one from the plurality of sub-sequences of trees.

In some embodiments of the present technology, a first one from the plurality of sub-sequences of trees and a second one from the plurality of sub-sequences of trees comprise a sub-set of same trees and a sub-set of differing trees.

In some embodiments of the present technology, a first one from the plurality of sub-sequences of trees includes a second one from the plurality of sub-sequences of trees and at least one next tree from the sequence of trees.

In some embodiments of the present technology, the given one from the plurality of sub-sequences of trees excludes the last tree in the sequence of trees.

In some embodiments of the present technology, the server is further configured to, in response to the uncertainty score being below a pre-determined threshold, validate the output of the GBDT model.

In some embodiments of the present technology, the server is further configured to, in response to the uncertainty score being above a pre-determined threshold, determine the in-use dataset is an out-of-domain dataset for the GBDT model.

In some embodiments of the present technology, the server is further configured to provide the output for the GBDT model and the uncertainty score to an other prediction model, the other prediction model having been trained to use the out-put of the GBDT model and the uncertainty score as inputs for generation an other output.

In some embodiments of the present technology, the other prediction model is at least one of a ranking model, Object Detection Neural Network (ODNN), and a Deep learning-based weather prediction (DLWP) model.

In some embodiments of the present technology, the GBDT model has been trained to classify the in-use dataset and the output is indicative of a predicted class of the in-use dataset.

In some embodiments of the present technology, the GBDT model has been trained to perform regression on the in-use dataset and the output being a continuous value predicted for the in-use dataset.

In some embodiments of the present technology, the server is further configured to determine a variance of the plurality of sub-outputs to generate the uncertainty score using the plurality of sub-outputs.

In the context of the present specification, unless expressly provided otherwise, an "electronic device", an "electronic device", a "server", a "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein. Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
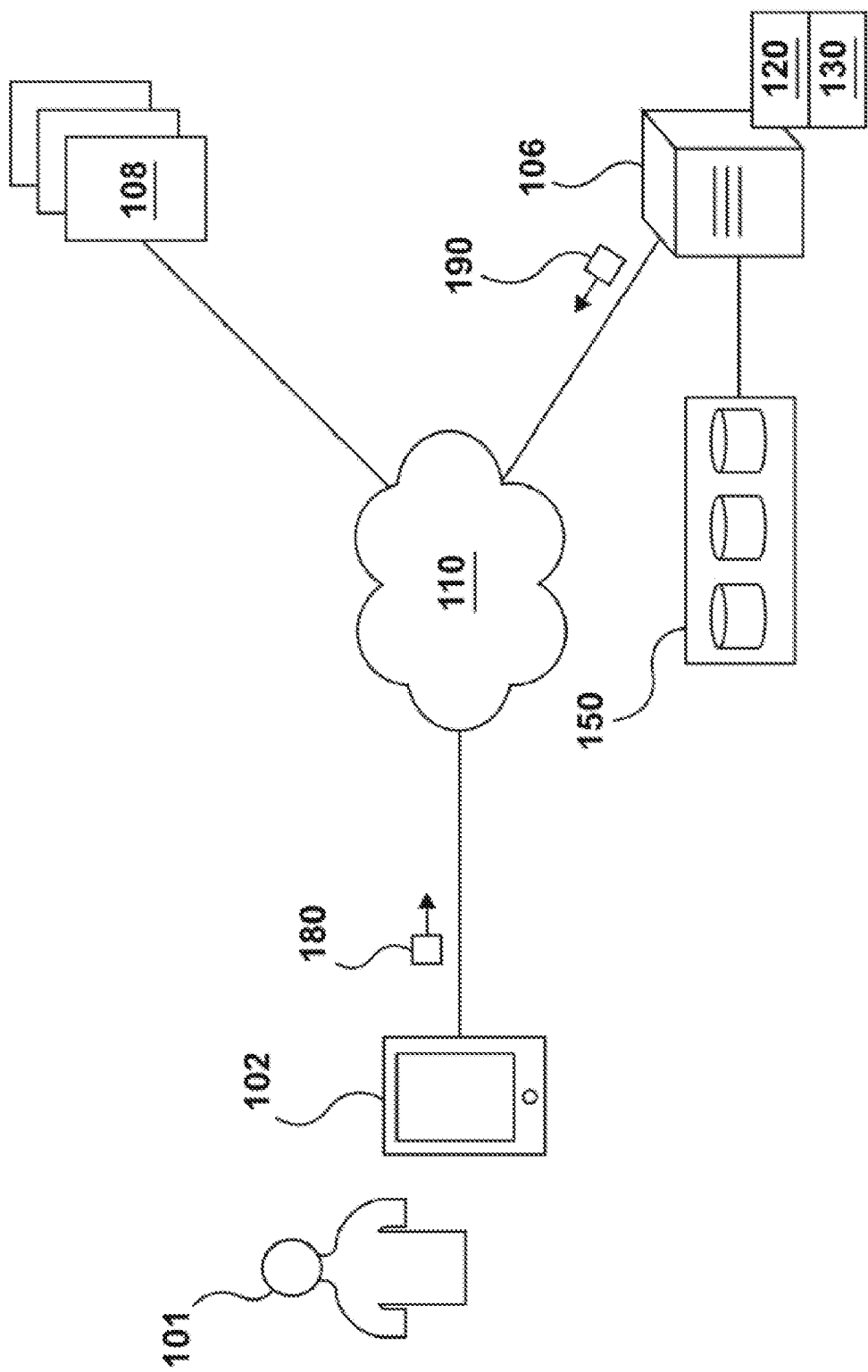
FIG. 1 is a representation of a system as in accordance to at least some non-limiting embodiments of the present technology.

An Appendix A is provided at the end of the present specification. The Appendix A includes a copy of an article entitled "Uncertainty in Gradient Boosting via Ensembles", and published in June 2020. This article provides additional background information, description of implementations of the non-limiting embodiments of the present technology, as well as some additional examples. The entirety of this article is incorporated herein by reference in their entirety, in all those jurisdictions where such incorporation by reference is allowed.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology.

Broadly speaking and as an example, the system 100 may be employed for providing search results to a given user in response to a query submitted thereby. To that end, the system 100 comprises inter alia an electronic device 102 associated with the user 101, a server 106, a plurality of resource servers 108 and a database system 150. For example, the user 101 may submit a given query via the electronic device 102 to the server 106 which, in response, is configured to provide search results to the user 101. The server 106 generates these search results based on information that has been retrieved from, for example, the plurality of resource servers 108 and stored in the database system 150. These search results provided by the system 100 may be relevant to the submitted query. It should be noted that the system 100 can be configured as another type of a computer-based platform, such as a recommendation system, a classification system, or the like. Some functionality of components of the system 100 will now be described in greater detail.

Electronic Device

As mentioned above, the system 100 comprises the electronic device 102 associated with the user 101. As such, the electronic device 102, or simply "device" 102 can sometimes be referred to as a "client device", "end user device" or "client electronic device". It should be noted that the fact that the electronic device 102 is associated with the user 101 does not need to suggest or imply any mode of operation—such as a need to log in, a need to be registered, or the like.

In the context of the present specification, unless provided expressly otherwise, "electronic device" or "device" is any computer hardware that is capable of running a software appropriate to the relevant task at hand. Thus, some non-limiting examples of the device 102 include personal computers (desktops, laptops, netbooks, etc.), smartphones, tablets and the like. The device 102 comprises hardware and/or software and/or firmware (or a combination thereof), as is known in the art, to execute a given browser application (not depicted).

Generally speaking, the purpose of the given browser application is to enable the user 101 to access one or more web resources. How the given browser application is implemented is not particularly limited. One example of the given browser application that is executable by the device 102 may be embodied as a Yandex™ browser. For example, the user 101 may use the given browser application to (i) navigate to a given search engine website, and (ii) submit a query in response to which (s)he is to be provided with relevant search results.

The device 102 is configured to generate a request 180 in response to the user 101 submitting a query. The request 180 may take form of one or more data packets comprising information indicative of the query submitted by the user 101. The device 102 is also configured to receive a response 190. The response 190 may take form of one or more data packets comprising information indicative of search results that are relevant to the submitted query and computer-readable instructions for displaying by the given browser application to the user 101 these search results. How the content of the response 190 is generated in response to the submitted query will be described in greater details herein further below.

Communication Network

The system 100 comprises a communication network 110. In one non-limiting example, the communication network 110 may be implemented as the Internet. In other non-limiting examples, the communication network 110 may be implemented differently, such as any wide-area communication network, local-area communication network, a private communication network and the like. In fact, how the communication network 110 is implemented is not limiting and will depend on inter alia how other components of the system 100 are implemented.

The purpose of the communication network 110 is to communicatively couple at least some of the components of the system 100 such as the device 102, the plurality of resource servers 108 and the server 106. For example, this means that the plurality of resource servers 108 is accessible via the communication network 110 by the device 102. In another example, this means that the plurality of resource servers 108 is accessible via the communication network 110 by the server 106. In a further example, this means that the server 106 is accessible via the communication network 110 by the device 102.

The communication network 110 may be used in order to transmit data packets amongst the device 102, the plurality of resource servers 108 and the server 106. For example, the communication network 110 may be used to transmit the request 180 from the device 102 to the server 106. In another example, the communication network 110 may be used to transmit the response 190 from the server 106 to the device 102.

Plurality of Resource Servers

As mentioned above, the plurality of resource servers 108 can be accessed via the communication network 110. The plurality of resource servers 108 may be implemented as conventional computer servers. In a non-limiting example of an embodiment of the present technology, a given one of the plurality of resource servers 108 may be implemented as a Dell™ PowerEdge™ Server running the Microsoft™ Windows Server™ operating system. The given one of the plurality of resource servers 108 may also be implemented in any other suitable hardware and/or software and/or firmware or a combination thereof.

The plurality of resource servers 108 are configured to host (web) resources that can be accessed by the device 102 and/or by the server 106. Which type of resources the plurality of resource servers 108 is hosting is not limiting. However, in some embodiments of the present technology, the resources may comprise digital documents, or simply "documents", that are representative of web pages.

For example, the plurality of resource servers 108 may host web pages, which means that the plurality of resource servers 108 may store documents representative of web pages and which are accessible by the device 102 and/or by the server 106. A given document may be written in a mark-up language and may comprise inter alia (i) content of a respective web page and (ii) computer-readable instructions for displaying the respective web page (content thereof).

A given one of the plurality of resource servers 108 may be accessed by the device 102 in order to retrieve a given document stored on the given one of the plurality of resource servers 108. For example, the user 101 may enter a web address associated with a given web page in the given browser application of the device 102 and, in response, the device 102 may access a given resource server hosting the given web page in order to retrieve the document representative of the given web page for rendering the content of the web page via the given browser application.

A given one of the plurality of resource servers 108 may be accessed by the server 106 in order to retrieve a given document stored on the given one of the plurality of resource servers 108. The purpose for the server 106 accessing and retrieving documents from the plurality of resource servers 108 will be described in greater detail herein further below.

Database System

The server 106 is communicatively coupled to the database system 150. Generally speaking, the database system 150 is configured to acquire data from the server 106, store the data, and/or provide the data to the server 106 for further use.

In some embodiments, the database system 150 may be configured to store information associated with a search engine hosted by the server 106. For example, the database system 150 may store information about previously performed searches by the search engine. Also, the database system 150 may store information about previously submitted queries to the server 106 and about documents that have been provided by the search engine of the server 106 as search results. As it will become apparent from the description herein further below, the database system 150 may also be configured to store an indexing structure to be used by the search engine of the server 106, such as an inverted index including term-specific posting lists of documents that contain the respective search terms.

It is contemplated that the database system 150 may store query data associated with respective queries submitted to the search engine. Query data associated with a given query may be of different types and is not limiting. For example, the database system 150 may store query data for respective queries such as, but not limited to:

popularity of a given query;
frequency of submission of the given query;
number of clicks associated with the given query;
indications of other submitted queries associated with the given query;
indications of documents associated with the given query;
other statistical data associated with the given query;
search terms associated with the given query;
number of characters within the given query; and
other query-intrinsic characteristics of the given query.

The database system 150 may also store document data associated with respective documents. Document data associated with a given document may be of different types and is not limiting. For example, the database system 150 may store document data for respective documents such as, but not limited to:

popularity of a given document;
click-through-rate for the given document;
time-per-click associated with the given document;
indications of queries associated with the given document;
other statistical data associated with the given document;
text associated with the given document;
file size of the given document; and
other document-intrinsic characteristics of the given document.

In at least some embodiments, it is contemplated that the database system 150 may be configured to store data in association with "document-query" pairs. For example, the database system 150 may be configured to store a list of documents in association with one or more queries for which they have been provided as search results by the search engine.

Furthermore, it is contemplated that the database system 150 may be configured to store label data associated with a given document and/or with a given document-query pair. Broadly speaking, label data contains information indicative of "ground-truth" about a respective document and/or a respective document-query pair. For example, label data associated with a given document may be indicative of whether the given document is a news article or a scientific article. In another example, label data associated with a given document-query pair may be indicative of a relevance of the respective document to the respective query from the given document-query pair (for example, in a form of a click/no click information).

How label data is collected and/or generated and then stored in the database system 150 is not particularly limiting. In some cases, label data may be collected from human assessors that have been tasked with "labelling" documents and/or document-query pairs. In other cases, label data may be generated by one or more computer-implemented procedures executed by the server 106 (i.e., machine-generated data), without departing from the scope of the present technology.

In some other embodiments, the database system 150 may be configured to store information associated with a GBDT model-based weather forecasting engine hosted by the server 106. For example, the database system 150 may store meteorological data about current temperatures, pressure values, wind measurements such as wind speed and wind direction, humidity, dew point, cloud cover, cloud layer(s), ceiling height, visibility, current weather, precipitation amount and the like for different geographical locations.

Also, the database system 150 may store information about previously received meteorological data to the server 106 and about weather forecasts that have been provided by the weather forecasting engine of the server 106. In at least some embodiments, it is contemplated that the database system 150 may be configured to store data in association with "meteorological data-weather forecast" pairs. For example, the database system 150 may be configured to store a list of weather forecasts in association with one or more meteorological data that caused to GBDT model-based weather forecasting engine hosted by the server 106 to generate corresponding weather forecasts. In this example, the label data associated with a given set of meteorological data used for a weather forecasting for a given date may be indicative of an actual weather at the given date.

In yet some other embodiments, the server 106 may be communicably connected to a self-driving car. The database system 150 may be configured to store information associated with self-driving car algorithm to be executed by the server 106. For example, the database system 150 may store data about current traffic around the self-driving car, a current state of the self-driving car, one or more potential itineraries of the self-driving car and the like. Those data may be in part, received from one of the resource servers 108 via the communication network 110. The server 106 may for example employ a GBDT model for predicting one or more features to be used by an Object Detection Neural Network (ODNN) algorithm for locating and classifying objects in the surroundings of the self-driving car.

In this example, the server 106 may receive data from one or more sensors such as image sensors, charge-coupled device (CCD) sensors, complementary metal oxide semiconductor (CMOS) sensors, digital cameras, light detection and ranging (LiDAR) sensors, radar sensors, time of flight (TOF) 3D cameras, stereo vision sensors comprising two or more cameras, 3D sonar, such as 3D ultrasound sensors, structured-light 3D cameras and/or scanners, and/or any other type of suitable sensors. This data may be employed for training the GBDT model to perform one or more predictions. These predictions may be employed as input features into an other prediction model, such as the ODNN algorithm. As it will be described, in addition to the one or more possible predictions made by one or more GBDT models, respective uncertainty scores may also be employed as input features into other prediction models, thereby increasing the amount of information that the other prediction model has at its disposal for making itself, better predictions.

Server

The system 100 comprises the server 106 that may be implemented as a conventional computer server. In an example of an embodiment of the present technology, the server 106 may be implemented as a Dell™ PowerEdge™ Server running the Microsoft™ Windows Server™ operating system. Needless to say, the server 106 may be implemented in any other suitable hardware and/or software and/or firmware or a combination thereof. In the depicted non-limiting embodiment of present technology, the server 106 is a single server. In alternative non-limiting embodiments of the present technology, the functionality of the server 106 may be distributed and may be implemented via multiple servers.

Generally speaking, the server 106 is under control and/or management of a search engine provider (not depicted) such as, for example, an operator of the Yandex™ search engine. As such, the server 106 may be configured to host a given search engine for performing one or more searches responsive to queries submitted by users of the given search engine.

For example, the server 106 may receive the request 180 from device 102 indicative of the query submitted by the user 101. The server 106 may perform a search responsive to the submitted query for generating search results that are relevant to the submitted query. As a result, the server 106 may be configured to generate the response 190 indicative of the search results and may transmit the response 190 to the device 102 for display of the search results to the user 101 via the given browser application, for example.

The search results generated for the submitted query may take many forms. However, in one non-limiting example of the present technology, the search results generated by the server 106 may be indicative of documents that are relevant to the submitted query. How the server 106 is configured to determine and retrieve documents that are relevant to the submitted query will become apparent from the description herein.

The server 106 may also configured to execute a crawler application 120. Broadly speaking, the crawler application 120 may be used by the server 106 in order to "visit" resources accessible via the communication network 110 and to retrieve/download them for further use. For example, the crawler application 120 may be used by the server 106 in order to access the plurality of resource servers 108 and to retrieve/download documents representative of web pages hosted by the plurality of resource servers 108.

In another example, the crawler application 120 may be used by the server 106 in order to access the plurality of resource servers 108 and to retrieve/download meteorological data that may be available at the plurality of resource servers 108, such as local meteorological data including wind speed and wind direction, humidity, dew point, cloud cover, cloud layer(s), ceiling height, visibility, current weather, precipitation amount and the like for different geographical locations in a vicinity of a respective resource server 108.

As such, in this example, each resource server 108 may store meteorological data indicative of weather at a physical location of the corresponding resource server 108 and/or at weather stations associated thereto. The crawler application 120 may be configured to retrieve/download meteorological data from pre-determined sets of resource servers 108 that comprises meteorological data about a same geographical location.

It is contemplated that the crawler application 120 may be periodically executable by the server 106 in order to retrieve/download documents that have been updated and/or became accessible over the communication network 110 since a previous execution of the crawler application 120.

Figure 2:
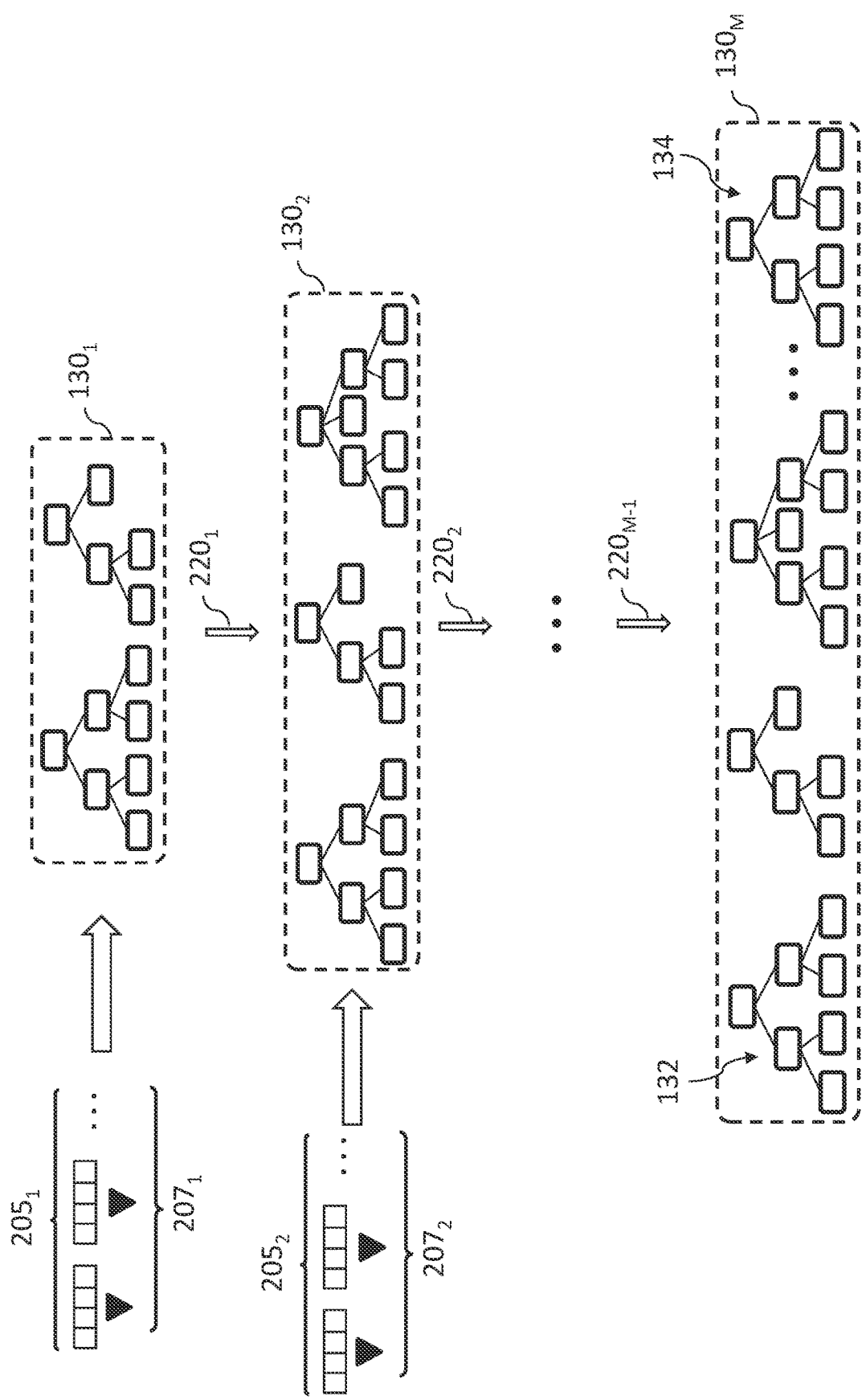
FIG. 2 is a representation a training phase of a Gradient Boosted Decision Tree (GBDT) model of the system of FIG. 1 using a stochastic approach, in accordance with at least some non-limiting embodiments of the present technology.

In the context of the present technology, the server 106 is configured to employ one or more Machine Learning Algorithms (MLAs) for supporting a variety of search engine services. With reference to FIG. 2, in at least some embodiments of the present technology, the server 106 is configured to execute a Gradient Boosting Decision Tree (GBDT) model 130 having a plurality of iteratively trained versions $130_1$ to $130_M$ where M may be a pre-determined threshold. Broadly speaking, a given DT model is a machine learning model having one or more "decision trees" that are used (i) to go from observations about an object (represented in the branches) to conclusions about the object's target value (represented in the leaves). It should be noted that the GBDT model 130 may be used by the server 106 for performing a variety of tasks that depend on inter alia specific implementations of the present technology.

In some cases, the GBDT model 130 may be trained to determine, during in-use, a prediction value for a given object which is one of a discrete set of prediction values. For example, some GBDT models may be trained to determine, during in-use for a given document, whether the given document is a news article or a scientific article. In these cases, such GBDT model can be referred to as "classification" tree MLAs, since they are trained to perform a classification task on a given object. Needless to say, the server 106 may use object classification solutions in many ways for providing better search engine services.

In other cases, the GBDT model 130 may be trained to determine, during in-use, a prediction value for a given object which is one from a continuous interval of prediction values. For example, some GBDT models may be trained to determine for a given document-query pair a relevance score ranging from "0" to "1". In these cases, such GBDT models can be referred to as "regression" tree MLAs, since they are trained to perform a regression task on a given object. Needless to say, the server 106 may use relevance prediction solutions and other regression solutions in many ways for providing better search engine services.

Irrespective of whether the GBDT model 130 is used by the server 106 to perform a regression task or a classification task during in-use, the GBDT model 130 is first "built" (or trained) using a training dataset comprising training objects and respective target values. In those cases where the GBDT model 130 is trained for performing a classification task, a given target value for a given training object may be indicative of a ground-truth class associated with the given training object. In those cases where the GBDT model 130 is trained for performing a regression task, a given target value for a given training object may be indicative of a ground-truth value of a selected variable (for which the GBDT model 130 is trained to make predictions) for the given object.

To summarize, the implementation of the GBDT model 130 by the server 106 can be broadly categorized into two phases—a training phase and an in-use phase. First, the GBDT model 130 is trained during the training phase. Then, once the decision-tree based MLA 130 is built based on training data, the GBDT model 130 is actually employed by the server 106 using in-use data during the in-use phase.

How the GBDT model 130 may be trained during its training phase will be described in greater details with reference to FIGS. 2 and 3, and how the GBDT model 130 may be used during its in-use phase will be described in greater details with reference to FIGS. 4 and 5.

Training Phase

A GBDT model is built using what is called "Gradient boosting". Generally speaking, Gradient Boosting (GB) can be used for both classification and regression problems. This technique creates a model from numerous "weak learners" (individual generated trees) which are added in a stage wise fashion with each new tree focusing on the errors of the previous ones to generate a so-called "forest of trees". This additive approach with a focus on errors made by the previous composition of the forest of trees converts these weak learners into a single strong predictor.

In a non-limiting embodiment of the present technology, building of the GBDT model 130 is performed using a modified GB technique, called "Stochastic Gradient Boosting". Broadly speaking, during a given training iteration in accordance with the Stochastic Gradient Boosting (SGB) approach, a subset of training objects are randomly selected for building a tree for that iteration. This stochastic sampling of training data has been shown to be beneficial for increasing the predictive quality of so-trained DT models.

In another non-limiting embodiment of the present technology, the GBDT model 130 is built using a modifies SGB technique, called "Stochastic Gradient Langevin Boosting". Broadly speaking, as opposed to conventional SGB algorithms where randomness is introduced by sampling training examples to be used at respective training iterations, the SDLB algorithm introduces randomness by adding noise to "estimated gradient values" based on which a new generated tree is built during the given training iteration.

In at least some embodiments of the present technology, the server 106 may be configured to train the GBDT model 130 in a similar manner to what has been described in a co-owned U.S. patent application Ser. No. 17/207,403, the contents of which is incorporated herein by reference in its entirety.

As depicted in FIG. 2, during execution of a given stochastic GB algorithm by the server 106, the server 106 may be configured to perform a large number of training iterations $220_1$ to $220_{M-1}$ where, during a respective training iteration $220_t$, a newly stochastically generated tree (i.e. generated based on stochastic GB techniques such as SGB and SGLB) is built and added to the current generated trees of the DT model 130.

It should be noted that the example provided below will be directed to the GBDT model 130 being be built for performing regression tasks. However, it should be noted that a decision-tree MLA with classification trees may be built in a similar manner, without departing from the scope of the present technology.

In one example, the server 106 may have access to a plurality of training datasets for training the GBDT model 130 at each training iteration. For example, the training dataset 300 may be stored in the database system 150 and retrieved by and/or provided to the server 106 for training the decision-tree based MLA 130.

Training datasets may be referred to training "objects", each associated with a training vector and respective target value, such that the training datasets comprise a plurality of training vectors $205_i$ and a plurality of corresponding target value $207_i$. Broadly speaking, a given training vector includes information about a respective training object, and a given target value is indicative of a ground-truth associated with a respective training object (the respective training vector). For example, the plurality of training datasets comprises (i) for a first training object, a first training vector and a first target value, (ii) for a second training object, a second training vector and a second target value, and so forth.

Continuing with the above example of training the GBDT model 130 for performing a regression task, in some non-limiting embodiments of the present technology, the GBDT model 130 may be trained to predict relevance scores for respective document-query pairs. In this example, (i) the first training object may be a respective document-query pair stored in the database 150, (ii) the first training vector may comprise one or more features of the respective document in that document-query pair and one or more features of the respective query in that document-query pair, (iii) and the first target value may be part of the label data associated with the respective document-query pair stored in the database system 150 and representative of a value ranging from "0" to "1", for example.

It should be noted that during a given training iteration $220_t$, the server 106 has already built a current sequence of trees during previous training iterations (performed similarly to the current training iteration). As such, the purpose of the given training iteration is to stochastically build a new tree that is to be added to the current sequence of "prior" trees.

In some embodiments, the server 106 may be configured to input the plurality of training datasets into the current sequence of prior trees and as a result, the current sequence of prior trees outputs a plurality of training output values. A given one from the plurality of training output values is therefore indicative of an output generated by the current sequence of prior trees for a respective training dataset. For example, the current sequence of prior trees may output a first training output value for the first training vector, a second training output value for the second training vector, and so forth.

It should be noted that the current sequence of prior trees is configured to predict a respective target value for a given training object based on the respective training vector. In other words, a given training output value determined by the current sequence of prior trees can be said to be an attempt by the current sequence of prior trees to estimate the respective target value associated with the respective training vector.

The server 106 is configured to apply a loss function for generating a plurality of estimated gradient values for the plurality of training output values. For example, the loss function may output, for a respective prediction-target pair, a respective estimated gradient value.

How the loss function is implemented is not limiting. The DT model 130 may be trained for performing convex optimization, in which case the loss function may be implemented as a convex loss function. In some non-limiting examples, a convex loss function may be one of, but is not limited to: hinge loss, logistic loss, and squared error loss. Also, the DT model 130 may be trained for performing non-convex optimization, in which case the loss function may be implemented as a non-convex loss function. In other non-limiting examples, a non-convex loss function may be one of, but is not limited to: a 0-1 loss, Normalized Discounted Cumulative Gain (NDCG), and PFound.

Irrespective of a particular type of loss function used, a given one from the plurality of estimated gradient values is indicative of a difference between the target value and the respective prediction value (difference in the respective prediction-target pair) or, simply put, a current prediction error.

It should be noted that the difference in a given prediction-target pair is representative of an error that the current sequence of prior trees made in their attempt to predict the respective target for a given training object. Needless to say, the specific type of error being determined depends on inter alia the type of loss function being used in various implementations of the present technology.

In some embodiments, one or more regularization techniques may be used during training for reducing overfitting of the model being learned. Regularization techniques may be used by the server 106 for constraining the fitting of the model, by reducing individual contribution of respective trees being added to the model.

It is contemplated that one or more noise-inducing functions may be employed by the server 106 for in a sense injecting "noise" into the training process of the GBDT model 130. In some embodiments, the server 106 may be configured to perform stochastic training of the GBDT model 130 where noise is injected via a random selection of training datasets that are to be inputted into the current sequence of prior trees for generating a next tree (e.g., SGB algorithm). In other embodiments, the server 106 may be configured to perform stochastic training of the DT model 130 where noise is injected when building and/or generating leaf values for a new tree (e.g. SGLB algorithm).

Irrespective of a specific manner in which noise is injected during the stochastic GB technique, the server 106 is configured to generate a "new" iteration-specific tree. The server 106 may be configured to store the iteration-specific tree with the current sequence of prior trees in the database system 150. The server 106 may be configured to perform a next training iteration similarly to the given training iteration, but instead of using the then current sequence of prior trees, the server 106 is configured to use a now current sequence of prior trees that also includes the new iteration-specific tree.

After a number M of such iterations, the server 106 is configured to generate the GBDT model 130 (i.e. train the GBDT model to generate the version $130_M$ of the GBDT model 130) comprising a plurality of stochastically built trees, referred to as a "sequence of trees".

Figure 3:
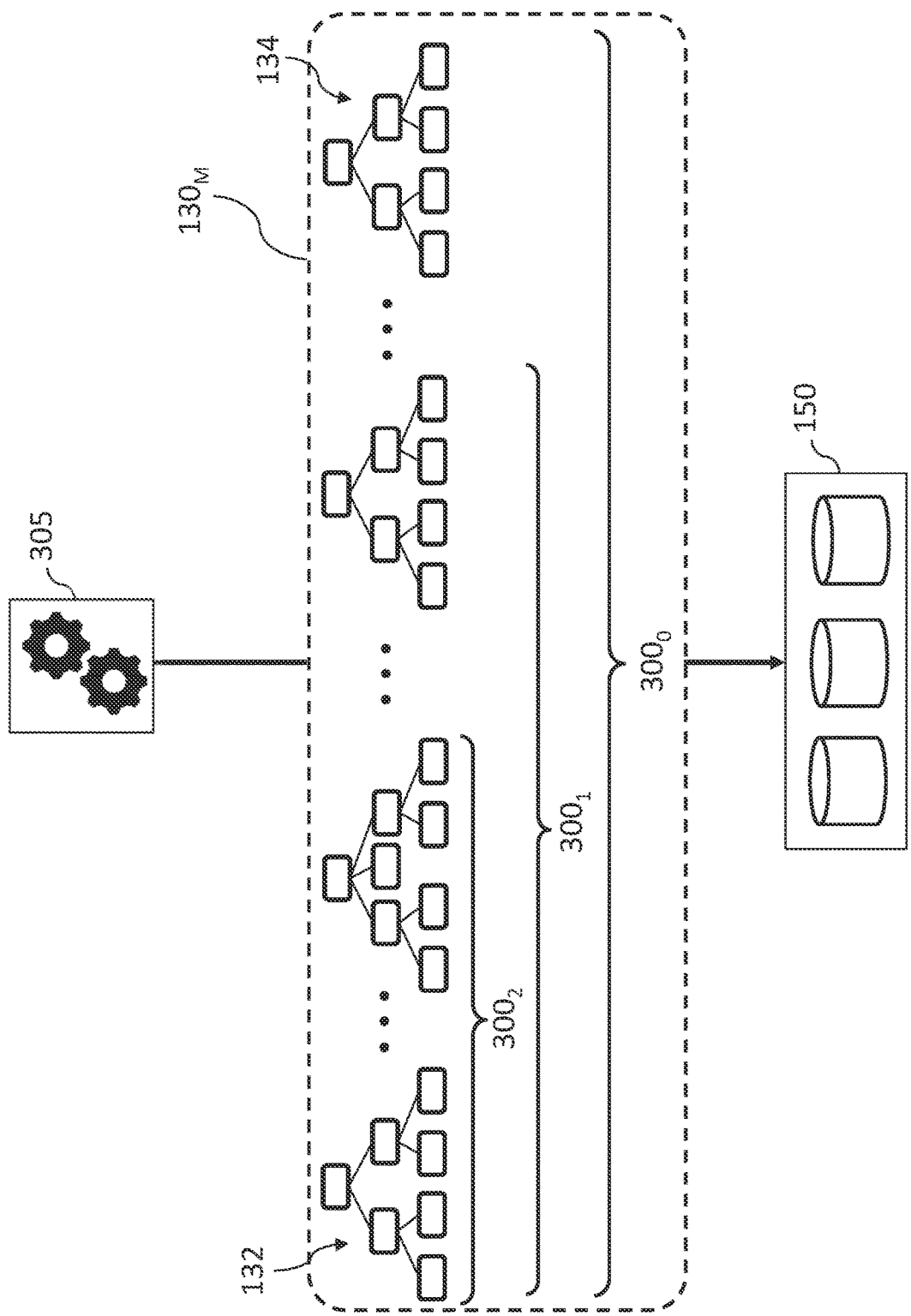
FIG. 3 is a representation of sub-models defined in the GBDT model of FIG. 2, in accordance with at least some non-limiting embodiments of the present technology.

As such, with reference to FIG. 3, a processing resource 305 may generate the GBDT model 130 and transmit the GBDT model 130 to the database system 150 for a storage thereof. A method for generating an uncertainty score for an output of the GBDT model 130 as contemplated in one embodiment of the present technology will now be described.

In this embodiment, the uncertainty score is indicative of knowledge uncertainty for the output of the GBDT model 130. In response to the uncertainty score being below a pre-determined threshold, the server 106 may be configured to validate, the output of the GBDT model 130. In response to the uncertainty score being above a pre-determined threshold, the server 106 may be configured to identify the in-use dataset as an out-of-domain dataset for the GBDT model 130.

In this embodiment, the processing resource 305 is hosted by the server 106. Other implementation of the processing resource 305 are contemplated in alternative embodiments. The processing resource 305 may be, for example, distributed across a plurality of different servers that are communicably connected one to another to generate the GBDT model 130.

The GBDT model 130 includes a sequence $300_0$ of trees comprising a plurality of trees, from an initial tree 132 to a last tree 134. As explained above, each tree of the sequence of trees $300_0$ has been stochastically generated based on prior trees in the sequence of trees $300_0$. The server 106 may define a plurality of sub-sequences of trees in the sequence $300_0$ as sub-models of the GBDT model 130. In this embodiment, each sub-sequence begins with the initial tree 132 and ends with a respective offset tree in the sequence of trees $300_0$ between the initial tree 132 and the last tree 134.

It should be noted that the respective offset tree is offset from the initial tree 132 by an offset parameter. The offset parameter may be indicative of a total number of trees in a respective sub-sequence. The offset parameter is different for each of the plurality of sub-sequences of trees. It can be said that at least one from the plurality of sub-sequences of trees excludes the last tree 134 in the sequence of trees $300_0$. Furthermore, a first one from the plurality of sub-sequences of trees may include a second one from the plurality of sub-sequences of trees and at least one next tree from the sequence of trees $300_0$.

A first sub-sequence $300_1$ and a second sub-sequence $300_2$ are depicted in FIG. 3. It should be noted that a large number of sub-sequences may be defined in the sequence $300_0$. In this illustrative example of FIG. 3, the first sub-sequence $300_1$ is nested in the second sub-sequence $300_2$. These two distinct sub-sequences comprise a different number of trees. This means that the first sub-sequence $300_1$ includes a total number of trees that is different from a total number of trees included in the second sub-sequence $300_2$.

In this embodiment, a first one from the plurality of sub-sequences of trees and a second one from the plurality of sub-sequences of trees comprise a sub-set of same trees and a sub-set of differing trees. Indeed, in the illustrative example of FIG. 3, the first sub-sequence $300_1$ and the second sub-sequence $300_2$ comprise a sub-set of same trees (i.e. the trees of the first sub-sequence $300_1$) and the second sub-sequence $300_2$ comprises a sub-set of different trees that are not comprised in the first sub-sequence $300_1$.

The sub-sequences of trees representative of sub-models can be said to form a "virtual ensemble of trees" in the sequence of trees $300_0$. As it will now be described in greater details, the tree-outputs of a virtual ensemble may be employed during an in-use iteration for generating a respective sub-output. Sub-outputs from a virtual ensemble may be combined for determining the uncertainty score.

In-Use Phase

Figure 4:
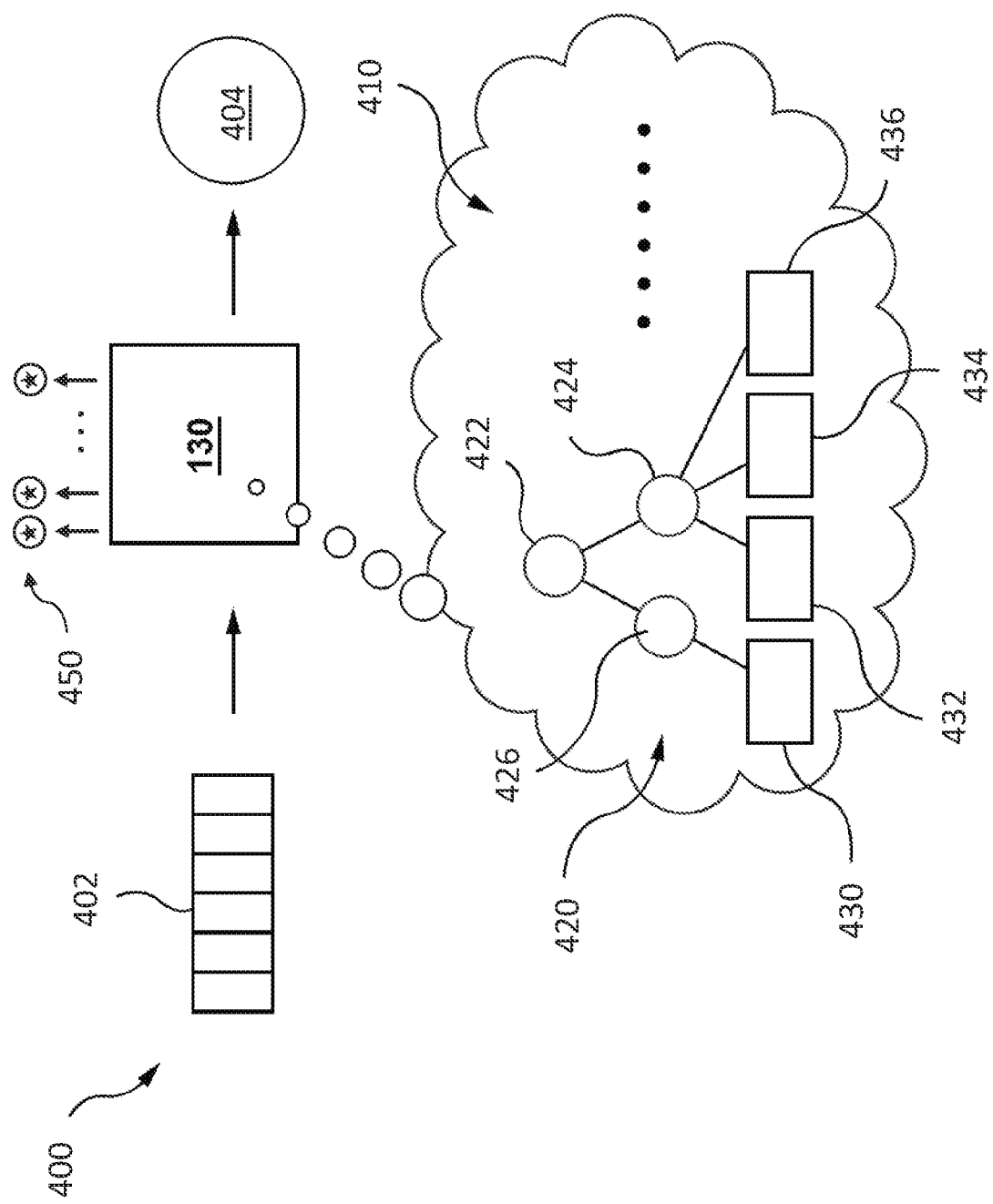
FIG. 4 is a representation of an in-use iteration of the GBDT model of FIG. 2, in accordance with at least some non-limiting embodiments of the present technology.

With reference to FIG. 4, there is depicted a representation 400 of a (single) current in-use iteration of the in-use phase of the (trained) GBDT model 130. Naturally, the in-use phase of the GBDT model 130 may comprise a large number of in-use iterations that are performed similarly to the current in-use iteration depicted in FIG. 4. Generally speaking, during the current in-use iteration, the GBDT model 130 is inputted with an in-use dataset about a given in-use object. For example, a given in-use object may be a document. In another example, the given in-use object may be a document-query pair. Irrespective of a type of the in-use object, the in-use dataset may be indicative of one or more features representative of the given in-use object.

As illustrated in FIG. 4, the in-use dataset about the given in-use object may be in a form of a feature vector 402. It should be noted that the feature vector 402 may be representative of one or more features of different types.

In one non-limiting example, a given feature may be of a binary type, and hence may have a value of "0" or "1". In another non-limiting example, a given feature may be of a real number type, and hence may have a real integer values and real non-integer values. In a further non-limiting example, a given feature may be of a categorical type, and hence may have a value representative of a sequence of characters such as a URL associated with the in-use object, a domain name, an IP address, a search query and/or a key word.

It should be noted that if the in-use object is a given document, the feature vector 402 may comprise one or more features associated with the given document. It should also be noted that if the in-use object is a given document-query pair, the feature vector 402 may comprise one or more features associated with the respective document from the given document-query pair, as well as one or more features associated with the respective query from the given document-query pair.

In some embodiments, in-use dataset for a given in-use object may be in a form of more than one feature vector. For example, if the in-use object is a given document-query pair, a first feature vector for the in-use object may comprise one or more features associated with the respective document from the given document-query pair, and a second feature vector for the in-use object may comprise one or more features associated with the respective query from the given document-query pair. Needless to say, how the given in-use object is processed for generating the feature vector 402 (and/or more than one feature vector) is not particularly limiting and may depend on inter alia a specific implementation of the present technology.

It should be noted that the (trained) GBDT model 130 is configured to output a "prediction" or output 404 based on the feature vector 402. As it will become apparent from the description herein further below, a type of the output 404 may depend on inter alia whether the GBDT model 130 is configured to perform a classification task or a regression task.

For example, in a case where the GBDT model 130 is trained to perform a classification task, the GBDT model 130 may be configured to predict based on the feature vector 402 whether the given in-use object (a given document, for example) is a news article or a scientific article. In these cases, the output 404 may be indicative of either (i) a news article class, or (ii) a scientific article class. In another example, in a case where the GBDT model 130 is trained to perform a regression task, the GBDT model 130 may be configured to predict based on the feature vector 402 a relevance value for the given in-use object (a given document-query pair, for example). In these cases, the output 404 may be a value ranging, for example, between "0" and "1".

Also, as it will become apparent from the description herein further below, the GBDT model 130 is based on a sequence of trees that are used, in combination, for generating the output 404. Broadly speaking, a given generated tree has a tree-like structure with nodes and branches, and which is used to make a prediction about a given in-use object by employing the in-use data provided thereto.

For example, the sequence of trees 410 comprises a tree 420. As it can be seen, the tree 420 has a root node 422, a pair of first level nodes 424 and 426, and four leaf nodes 430, 432, 434, and 436. It should be noted that the root node 422 and the first level nodes 424 and 426 are associated with respective features and split values allowing to, in a sense, "decide" which branches of the tree 420 are to be followed by the in-use object for arriving to a given one of the leaf nodes 430, 432, 434, and 436 based on the in-use data.

For example, let it be assumed that the in-use object is being analyzed by the tree 420. The server 106 may be configured to identify a given feature value in the feature vector 402 associated with a given feature corresponding to the respective feature of the root node 422. The server 106 may be configured to compare this value against the respective split value of the root node 422. Depending on how this value compares to the respective split value, the in-use object will be, in a sense, "directed" towards either the first level node 424 or the first level node 426. Recalling that the root node 422 and level nodes are associated with respective features and split values, a similar logic can be performed at a corresponding first level node for, in a sense, "directing" the in-use object towards one of the four leaf nodes 430, 432, 434, and 436.

It should also be noted that each of the leaf nodes 430, 432, 434, and 436 is associated with a respective leaf value. Let it be assumed that based on the in-use data (e.g., feature values in the feature vector 402) about the in-use object, the in-use object is "directed" towards the leaf node 430. In this case, the prediction of the tree 420 for the given in-use object is the leaf value of the leaf node 430. Recalling that the GBDT model 130 is based on the sequence of trees 410, individual predictions by respective generated trees from the sequence of trees 410 (e.g., the leaf values of leaf nodes of respective generated trees towards which the given in-use object is directed) are used together, in combination, for determining the output 404 for the given in-use object.

How the individual predictions by respective trees from the plurality of generated trees 410 are combined for determining the output 404 may depend on the specific implementations of the present technology. In one example however, the individual predictions by respective trees from the sequence of trees 210 may be added (and potentially weighted) for determining the output 204.

Also, generated trees may vary in size and complexity and, therefore, may comprise more than one level of level nodes and more than four leaf nodes. The size and complexity of generated trees may depend on inter alia specific implementations of the present technology.

In this embodiment, the GBDT model 130 is configured to generate a plurality of sub-outputs 450 using a plurality of sub-models of the GBDT model 130. More specifically, each sub-output is generated by a corresponding sub-model of the plurality of sub-models—that is, by a corresponding sub-sequence of trees. Individual tree-outputs (such as of the tree 420, for example) in a same sub-sequence may be combined to generate the sub-output of the corresponding sub-model. Therefore, a number of sub-outputs 450 equals a number of sub-models (in a virtual ensemble) of the GBDT model 130.

Figure 5:
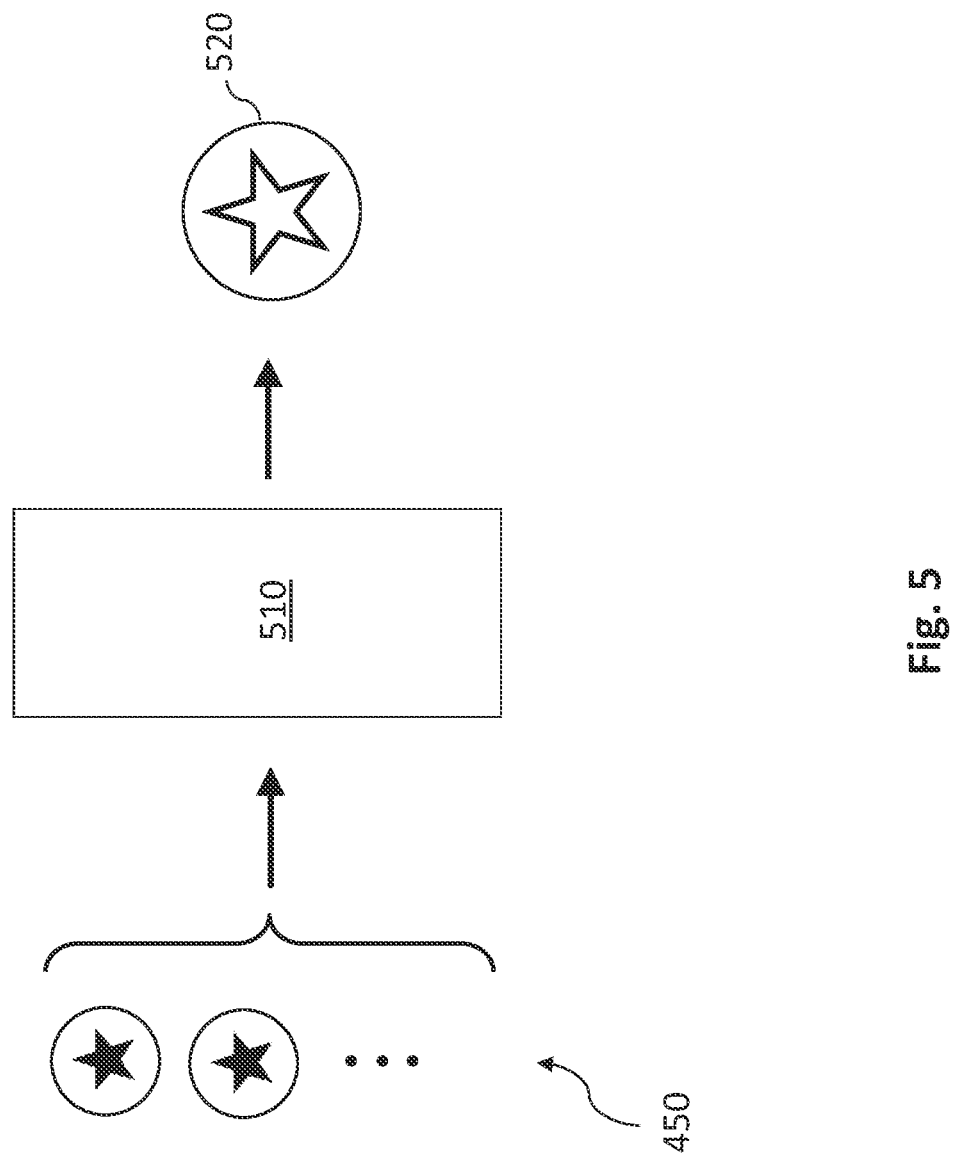
FIG. 5 is a representation of a process for generating an uncertainty score for the in-use iteration of FIG. 4, in accordance with at least some non-limiting embodiments of the present technology.

With reference to FIG. 5, a schematic illustration of how an uncertainty score is generated for the in-use iteration is depicted. The server 106 may execute a disagreement function 510 configured to receive the plurality of sub-outputs 450 of the GBDT model 130 and to generate an uncertainty score 520.

In some embodiments, it can be said that the uncertainty score 520 may thus be generated based on a determination of a variance between the plurality of sub-outputs 450.

As such, a computation time for determining the knowledge uncertainty of an output may be decreased compared to some conventional methods. Indeed, in this embodiment, individual tree-outputs of the sequence of trees $300_O$ of the GBDT model 130 can be computed once during a given in-use iteration and further combined in different combinations in accordance with the respective sub-sequences of trees to form the sub-outputs 450 which, upon being received by the disagreement function 510, can cause the generation of the uncertainty score 520. As such, the sequence of trees $300_O$ of the GBDT model 130 may be inputted with the in-use dataset once to obtain the output itself (based on combination of tree-outputs of all trees) and the uncertainty score 520 (based on combinations of tree-outputs of respective sub-sequences of trees) indicative of knowledge uncertainty in the in-use dataset.

In a non-limiting embodiment of the present technology, the output 404 of the GBDT model 130 and the uncertainty score 520 may be transmitted by the server 106 to an other prediction model, the other prediction model having been trained to use the output 404 of the GBDT model and the uncertainty score 520 as inputs for generation an other output. For example, the other predication model may be a ranking algorithm of a search engine, a DLWP model, an ODNN model, or any other prediction model that may suitably use the output 404 and the uncertainty score 520 as model inputs.

Figure 6:
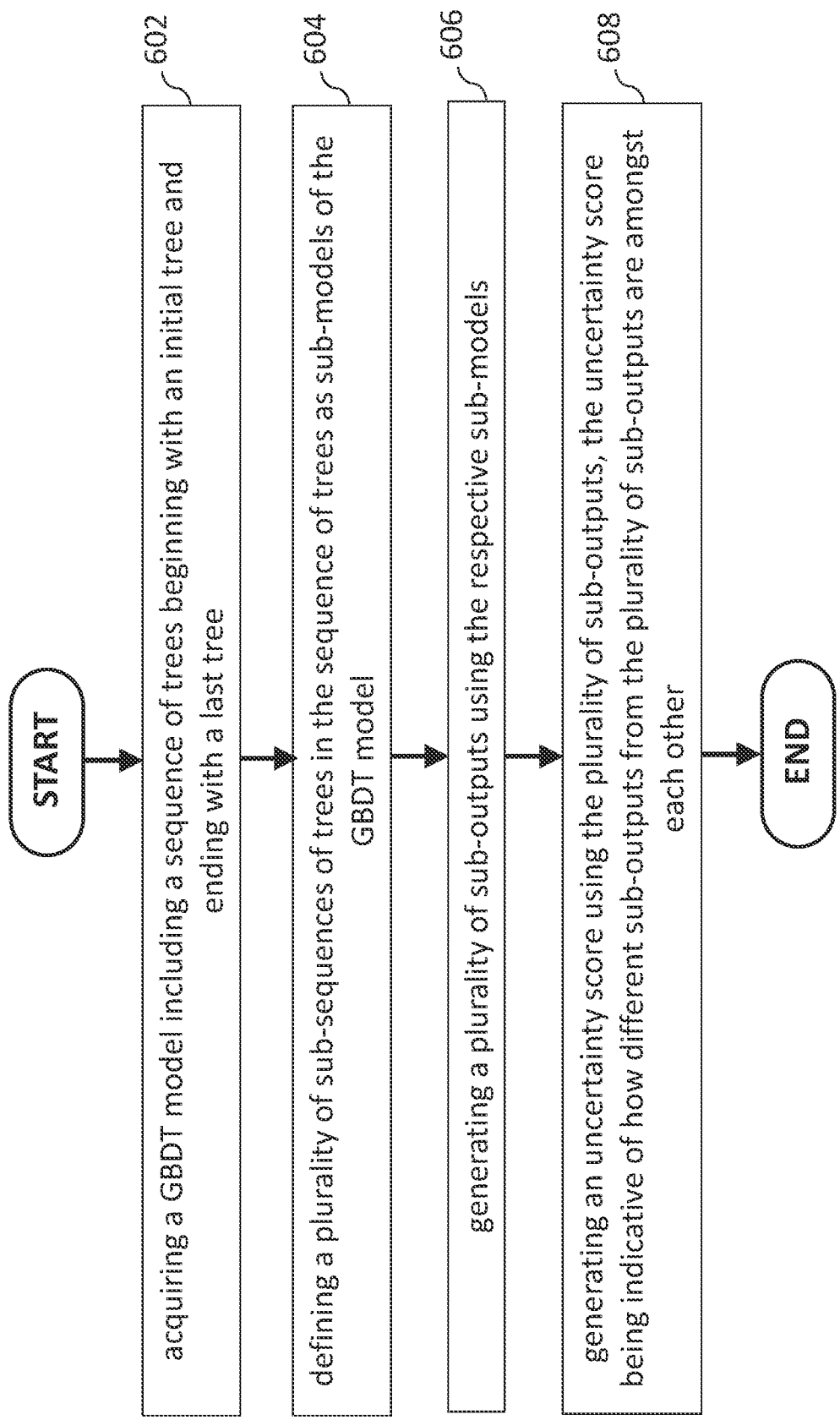
FIG. 6 is a schematic block diagram of a method of training the decision-tree based MLA of FIG. 2 by a server of FIG. 1, as envisioned in at least some non-limiting embodiments of the present technology.

With reference to FIG. 6, there is depicted a schematic block diagram of a method 600 as contemplated in at least some non-limiting embodiments of the present technology. Various steps of the method 600 of generating an uncertainty score for an output of the GBDT model 130 will now be discussed in greater detail.

Step 602: Acquiring a GBDT Model Including a Sequence of Trees Beginning with an Initial Tree and Ending with a Last Tree The method 600 begins at step 602 with the server 106 configured to acquire the GBDT model 130 including the sequence of trees $300_O$ beginning with the initial tree 132 and ending with the last tree 134. In this embodiment, a given tree of the sequence of trees has been stochastically built during a current training iteration of the GBDT model 130 based on a current sequence of prior trees available at the current training iteration.

It is contemplated that in at least some embodiments of the present technology, the GBDT model 130 may have been trained to classify an in-use dataset, that may be in the form of the feature vector 402, and the output is indicative of a predicted class of the in-use dataset. In yet at least some other embodiments, the GBDT model 130 may have trained to perform regression on the in-use dataset and the output 404 being a continuous value predicted for the in-use dataset.

Step 604: Defining a Plurality of Sub-Sequences of Trees in the Sequence of Trees as Sub-Models of the GBDT Model The method 600 continues to step 604 with the server 106 configured to define the plurality of sub-sequences of trees in the sequence of trees $300_O$ as sub-models of the GBDT model 130. In this embodiment, at least one from the plurality of sub-sequences of trees excludes the last tree 134 in the sequence of trees $300_O$.

Furthermore, a first one from the plurality of sub-sequences of trees may include a second one from the plurality of sub-sequences of trees and at least one next tree from the sequence of trees $300_O$. It can be said that, in this embodiment, that the second one from the plurality of sub-sequences of trees is nested in the first one from the plurality of sub-sequences of trees. These two distinct sub-sequences may thus comprise a different number of trees. In other words, the first one from the plurality of sub-sequences of trees includes a total number of trees that is different from a total number of trees included in the second one from the plurality of sub-sequences of trees.

In this embodiment, the first one from the plurality of sub-sequences of trees and the second one from the plurality of sub-sequences of trees may comprise a sub-set of same trees and a sub-set of differing trees.

Step 606: Generating a Plurality of Sub-Outputs Using the Respective Sub-Models The method 600 continues to step 604 with the server 106 configured to, during a given in-use iteration, generate the plurality of sub-outputs 450 using the respective sub-models. In this embodiment, a given one of the plurality of sub-outputs 450 is generated by a respective one of the plurality of sub-sequences of trees.

As such, for an inputted in-use dataset, individual tree-outputs of the sequence of trees $300_O$ of the GBDT model 130 are computed once. They may be further combined in different combinations in accordance with the respective sub-sequences of trees to form the sub-outputs 450 which, upon being received by the disagreement function 510, may cause the generation of the uncertainty score 520. As such, the sequence of trees $300_O$ of the GBDT model 130 may be inputted with the in-use dataset once, for both obtaining the output itself (based on combination of tree-outputs of all trees) and the uncertainty score 520 (based on combinations of tree-outputs of respective sub-sequences of trees) indicative of knowledge uncertainty in the in-use dataset.

Step 608: Generating an Uncertainty Parameter Using the Plurality of Sub-Outputs, the Uncertainty Parameter being Indicative of how Different Sub-Outputs from the Plurality of Sub-Outputs are Amongst Each Other The method 600 continues to step 604 with the server 106 configured to, during the given in-use iteration, generate the uncertainty score 520 using the plurality of sub-outputs 450, the uncertainty score 520 being indicative of how different sub-outputs from the plurality of sub-outputs are amongst each other and, as such, a knowledge uncertainty of the in-use data. In this embodiment, generation of the uncertainty score 520 may comprise determining a variance of the plurality of sub-outputs 450.

In at least one non-limiting embodiment, the method 600 further comprises, in response to the uncertainty score being below a pre-determined threshold, confirming, by the server 106, the output 404 of the GBDT model. For example, the server 106 may be configured to confirm that the output 404 is not an uncertain output. In the same or another embodiment, the method 600 further comprises, in response to the uncertainty score being above a pre-determined threshold, determining, by the server, the in-use dataset is an out-of-domain dataset for the GBDT model 130. This may result in the server 106 performing one or more remedial actions. Such actions may include: "flagging" the output for a human operator, "flagging" the in-use dataset for future labelling and adding it to a list of training datasets for a future training session, generating an output feature vector including the output itself, the respective uncertainty score, and/or an indication of whether the respective uncertainty score is above the threshold, and so forth. The output feature vector may be used by one or more other prediction models as input features.

The method 600 may further comprise generating, by the server 106, the output 404 for the in-use dataset using the sequence of trees 300₀, the output 404 being generated using all trees from the sequence of trees 300₀.

In this embodiment, the method 600 may further comprise providing, by the server 160, the output for the GBDT model 130 and the uncertainty score 520 to another prediction model such as a ranking algorithm of a search engine, an ODNN model or a DLWP model, the other prediction model having been trained to use the output 404 of the GBDT model 130 and the uncertainty score 520 as inputs for generation an other output.

In at least some non-limiting embodiments of the technology, a plurality of other GBDT models can be trained based on training datasets that are from a same domain than the training sets used to train the GBDT model 130 illustrated on FIG. 2. It should be noted that due to the stochastic nature of the training process, although the other GBDT models can be trained on the same training datasets, the trees in the other GBDT models will be somewhat different from the trees in the GBDT model. Although they are likely to generate similar outputs to the output of the GBDT model for a same in-domain input, they are likely to generate dissimilar outputs to the output of the GBDT model for a same out-of-domain input. In this embodiments, an uncertainty score may further be generated based on outputs of the other GBDT models to assess a level of "disagreement" between the GBDT models.

As such, in an alternative embodiments of the present technology, the server 106 may be configured to perform a computer-implemented method that comprises acquiring, by the server 106, a plurality of other GBDT models (i.e. distinct from the GBDT model 130) including respective other sequences of trees, the plurality of other GBDT models having been trained on a same plurality of training datasets as the GBDT model 130 and each one from the plurality of other GBDT models being different from the GBDT model. In this embodiment, during a given in-use iteration of the GBDT model 130 executable for an in-use dataset, the method may comprise generating, by the server 160, a plurality of outputs using the respective ones from the plurality of other GBDT models, a given one of the plurality of outputs being generated by a respective other sequence of trees and generating, by the server 160, a global uncertainty score using the plurality of outputs, the uncertainty score being indicative of how different outputs from the plurality of outputs are amongst each other.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating an uncertainty score for an output of a Gradient Boosted Decision Tree (GBDT) model for a self-driving vehicle, the output being a prediction of the GBDT model for an in-use dataset, the method executable by a server, the method comprising:
   acquiring the GBDT model including a sequence of trees beginning with an initial tree and ending with a last tree,
      a given one of the sequence of trees having been stochastically built during a training iteration of the GBDT model based on a sequence of prior trees available at the training iteration;
   defining a plurality of sub-sequences of trees in the sequence of trees as sub-models of the GBDT model,
      a given one of the plurality of sub-sequences of trees beginning with the initial tree and ending with a respective offset tree in the sequence of trees between the initial tree and the last tree, the respective offset tree being offset from the initial tree by an offset parameter, the offset parameter being different for each of the plurality of sub-sequences of trees;
   during a given in-use iteration of the GBDT model executable for the in-use dataset:
      generating a plurality of sub-outputs using the respective sub-models by inputting the in-use dataset to the respective sub-models,
         wherein the in-use dataset is received from at least one of: an image sensor, a charge-coupled device (CCD) sensor, complementary metal oxide semiconductor sensor (CMOS), a digital camera, a light detection and ranging (LiDAR) sensor, a radar sensor, a time of flight (TOF) 3D camera, a stereo vision sensor or a 3D sonar associated with the self-driving vehicle,
         a given one of the plurality of sub-outputs being generated by a respective one of the plurality of sub-sequences of trees;
      generating the uncertainty score using the plurality of sub-outputs, the uncertainty score being indicative of how different sub-outputs from the plurality of sub-outputs are amongst each other;
      in response to the uncertainty score being below a predetermined threshold, providing the output of the GBDT model and the uncertainty score to an Object Detection Neural Network (ODNN) algorithm of the self-driving vehicle, the ODNN being configured for classifying objects in a surrounding of the self-driving vehicle based on the output of the GBDT model and the uncertainty score; and
      controlling the self-driving vehicle based on the output of the ODNN.

2. The method of claim 1, wherein the method further comprises, during the given in-use iteration:
   generating the output for the in-use dataset using the sequence of trees, the output being generated using all trees from the sequence of trees.

3. The method of claim 1, wherein a first one from the plurality of sub-sequences of trees is nested in a second one from the plurality of sub-sequences of trees.

4. The method of claim 1, wherein a first one from the plurality of sub-sequences of trees includes a total number of trees that is different from a total number of trees included in a second one from the plurality of sub-sequences of trees.

5. The method of claim 1, wherein a first one from the plurality of sub-sequences of trees and a second one from the plurality of sub-sequences of trees comprise a sub-set of same trees and a sub-set of differing trees.

6. The method of claim 1, wherein a first one from the plurality of sub-sequences of trees includes a second one from the plurality of sub-sequences of trees and at least one next tree from the sequence of trees.

7. The method of claim 1, wherein the given one from the plurality of sub-sequences of trees excludes the last tree in the sequence of trees.

8. The method of claim 1, wherein the GBDT model has been trained to classify the in-use dataset and the output is indicative of a predicted class of the in-use dataset.

9. The method of claim 1, wherein the GBDT model has been trained to perform regression on the in-use dataset and the output being a continuous value predicted for the in-use dataset.

10. The method of claim 1, wherein generating, the uncertainty score using the plurality of sub-outputs comprises determining a variance of the plurality of sub-outputs.

11. A method of generating an uncertainty score for an output of a Gradient Boosted Decision Tree (GBDT) model for a self-driving vehicle, the output being a prediction of the GBDT model for an in-use dataset, the method executable by a server, the method comprising:
    acquiring the GBDT model including a sequence of trees, a given one from the sequence of trees having been stochastically built during a training iteration of the GBDT model based on a sequence of trees available at the training iteration;
    during a given in-use iteration of the GBDT model executable for the in-use dataset:
        generating using the sequence of trees, a plurality of tree-outputs for the in-use dataset, a given one from the plurality of tree-outputs generated by a respective one from the sequence of trees, wherein the in-use dataset is received from at least one of: an image sensor, a charge-coupled device (CCD) sensor, complementary metal oxide semiconductor sensor (CMOS), a digital camera, a light detection and ranging (LiDAR) sensor, a radar sensor, a time of flight (TOF) 3D camera, a stereo vision sensor or a 3D sonar associated with the self-driving vehicle;
        for a first sub-sequence of trees in the sequence of trees, generating in response to receiving the in-use dataset, a first sub-output by combining tree-outputs from the first sub-sequence of trees beginning with an initial tree, the first sub-sequence of trees including M number of sequential trees from the sequence of trees;
        for a second sub-sequence of trees in the sequence of trees,
            generating in response to receiving the in-use dataset, a second sub-output by combining tree-outputs from the second sub-sequence of trees beginning with the initial tree, the second sub-sequence of trees including N number of sequential trees from the sequence of trees, the N number being different from the M number; and
        generating the uncertainty score using the first and the second sub-outputs, the uncertainty score being indicative of how different the first sub-output is from the second sub-output;
        in response to the uncertainty score being below a predetermined threshold, providing the output of the GBDT model and the uncertainty score to an Object Detection Neural Network (ODNN) algorithm of the self-driving vehicle, the ODNN being configured for classifying objects in a surrounding of the self-driving vehicle based on the output of the GBDT model and the uncertainty score; and
        controlling the self-driving vehicle based on the output of the ODNN.

12. The method of claim 11, wherein the method further comprises:
    generating the output for the GBDT model by combining all tree-outputs in the plurality of tree-outputs.

13. The method of claim 11, wherein the first sub-sequence of trees and the second sub-sequence of trees form a virtual ensemble in the sequence of trees.

14. A server for generating an uncertainty score for an output of a Gradient Boosted Decision Tree (GBDT) model for a self-driving vehicle, the output being a prediction of the GBDT model for an in-use dataset, the server comprising at least one processor and a memory configured to store instructions which, upon being executed by the at least one processor, cause the server to:
    acquire the GBDT model including a sequence of trees beginning with an initial tree and ending with a last tree,
        a given one of the sequence of trees having been stochastically built during a training iteration of the GBDT model based on a sequence of prior trees available at the training iteration;
    define a plurality of sub-sequences of trees in the sequence of trees as sub-models of the GBDT model,
        a given one of the plurality of sub-sequences of trees beginning with the initial tree and ending with a respective offset tree in the sequence of trees between the initial tree and the last tree, the respective offset tree being offset from the initial tree by an offset parameter, the offset parameter being different for each of the plurality of sub-sequences of trees;
    during a given in-use iteration of the GBDT model executable for the in-use dataset:
        generate a plurality of sub-outputs using the respective sub-models by inputting the in-use dataset to the respective sub-models,
            wherein the in-use dataset is received from at least one of: an image sensor, a charge-coupled device (CCD) sensor, complementary metal oxide semiconductor sensor (CMOS), a digital camera, a light detection and ranging (LiDAR) sensor, a radar sensor, a time of flight (TOF) 3D camera, a stereo vision sensor or a 3D sonar associated with the self-driving vehicle,
            a given one of the plurality of sub-outputs being generated by a respective one of the plurality of sub-sequences of trees;
        generate the uncertainty score using the plurality of sub-outputs, the uncertainty score being indicative of how different sub-outputs from the plurality of sub-outputs are amongst each other;
        in response to the uncertainty score being below a predetermined threshold, provide the output of the GBDT model and the uncertainty score to an Object Detection Neural Network (ODNN) algorithm of the self-driving vehicle, the ODNN being configured for classifying objects in a surrounding of the self-driving vehicle based on the output of the GBDT model and the uncertainty score; and
        control the self-driving vehicle based on the output of the ODNN.

15. The server of claim 14, wherein the server is further configured to, during the given in-use iteration:

generate the output for the in-use dataset using the sequence of trees, the output being generated using all trees from the sequence of trees.

16. The server of claim 14, wherein a first one from the plurality of sub-sequences of trees is nested in a second one from the plurality of sub-sequences of trees.

17. The server of claim 14, wherein a first one from the plurality of sub-sequences of trees includes a total number of trees that is different from a total number of trees included in a second one from the plurality of sub-sequences of trees.

18. The server of claim 14, wherein a first one from the plurality of sub-sequences of trees and a second one from the plurality of sub-sequences of trees comprise a sub-set of same trees and a sub-set of differing trees.

19. The server of claim 14, wherein a first one from the plurality of sub-sequences of trees includes a second one from the plurality of sub-sequences of trees and at least one next tree from the sequence of trees.

20. The server of claim 14, wherein the given one from the plurality of sub-sequences of trees excludes the last tree in the sequence of trees.

21. The server of claim 14, wherein the GBDT model has been trained to classify the in-use dataset and the output is indicative of a predicted class of the in-use dataset.

22. The server of claim 14, wherein the GBDT model has been trained to perform regression on the in-use dataset and the output being a continuous value predicted for the in-use dataset.

23. The server of claim 14, further configured to determine a variance of the plurality of sub-outputs to generate the uncertainty score using the plurality of sub-outputs.

* * * * *